US011639038B2

(12) United States Patent
Jones et al.

(10) Patent No.: US 11,639,038 B2
(45) Date of Patent: May 2, 2023

(54) INSTALLATION OF INDEXING FEATURES ONTO COMPOSITE PARTS

(71) Applicant: The Boeing Company, Chicago, IL (US)

(72) Inventors: Darrell D. Jones, Mill Creek, WA (US); Daniel R. Smith, Woodinville, WA (US); Frederick M. Swanstrom, Normandy Park, WA (US); Monte D. Wright, Kenmore, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/454,271

(22) Filed: Nov. 10, 2021

(65) Prior Publication Data
US 2022/0152954 A1 May 19, 2022

Related U.S. Application Data

(60) Provisional application No. 63/115,061, filed on Nov. 18, 2020.

(51) Int. Cl.
*B64F 5/10* (2017.01)
*B29C 70/54* (2006.01)
*B29C 70/44* (2006.01)
*B29L 31/30* (2006.01)

(52) U.S. Cl.
CPC .......... *B29C 70/545* (2013.01); *B29C 70/446* (2013.01); *B64F 5/10* (2017.01); *B29L 2031/3082* (2013.01); *B29L 2031/3085* (2013.01)

(58) Field of Classification Search
CPC ... B29C 70/545; B29C 70/446; B29C 70/541; B64F 5/10; B29L 2031/3082; B29L 2031/3085; B32B 37/18–185; B32B 2605/18; B32B 3/06
See application file for complete search history.

(56) References Cited

U.S. PATENT DOCUMENTS

2004/0217497 A1* 11/2004 Engwall ................ B29C 70/545
264/156
2016/0167317 A1* 6/2016 Bergmann .............. B29C 70/30
156/510

FOREIGN PATENT DOCUMENTS

EP 2881234 A1 10/2015
EP 3034284 A1 6/2016

OTHER PUBLICATIONS

Netherlands Patent Office Written Opinion and Search Report with English Translation, dated Jun. 18, 2021, regarding Application No. NL2027423, 13 pages.
Extended European Search Report regarding Application No. 21207586.5, dated May 9, 2022, 5 pages.

* cited by examiner

*Primary Examiner* — Jun S Yoo
(74) *Attorney, Agent, or Firm* — Yee & Associates, P.C.

(57) ABSTRACT

Systems and methods are provided for processing composite parts. One embodiment is a method for preparing a composite part for assembly. The method includes receiving a mandrel to which a composite part has been molded, and operating a work station to install an indexing feature into a manufacturing excess of the composite part.

40 Claims, 16 Drawing Sheets

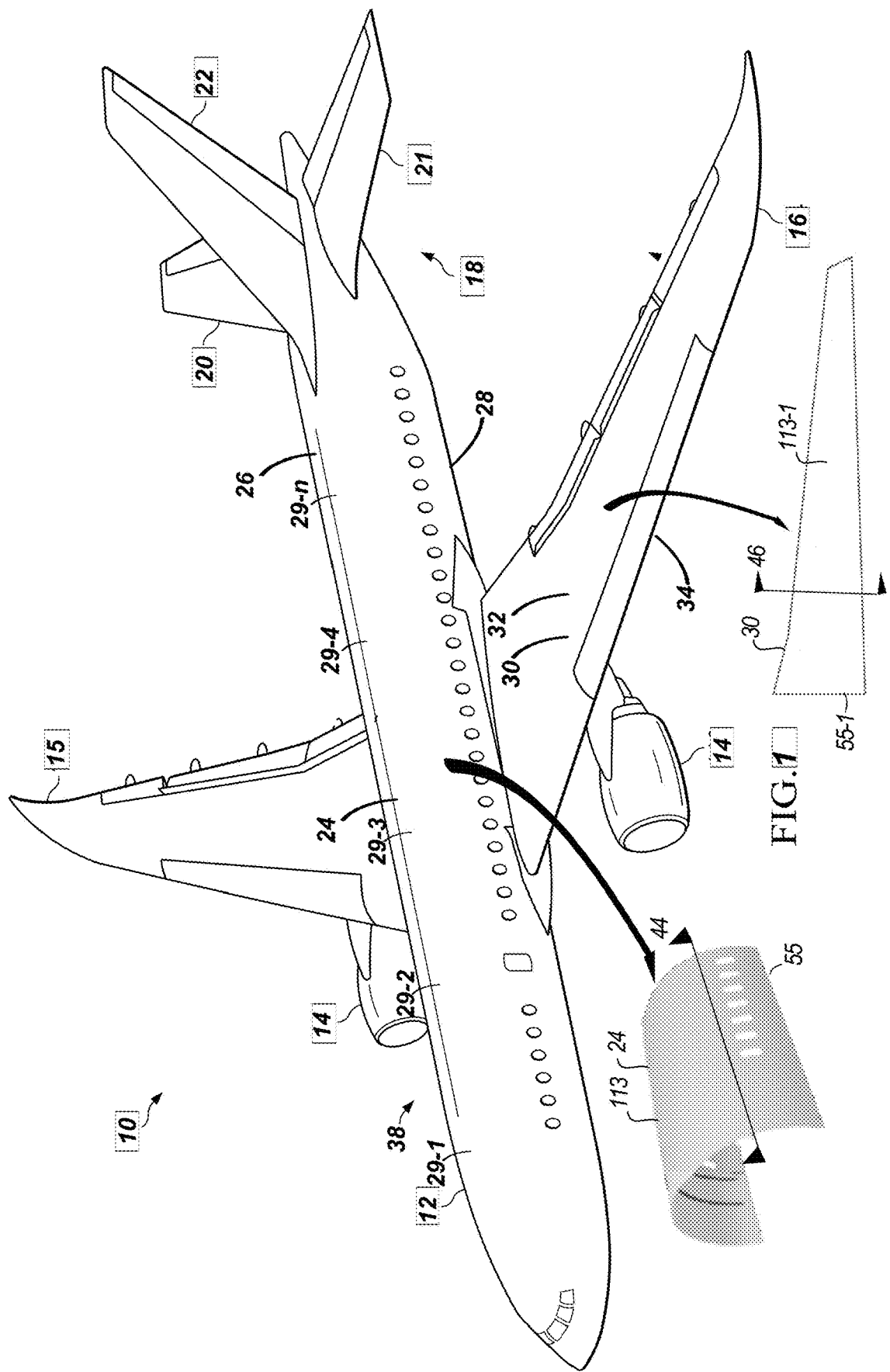

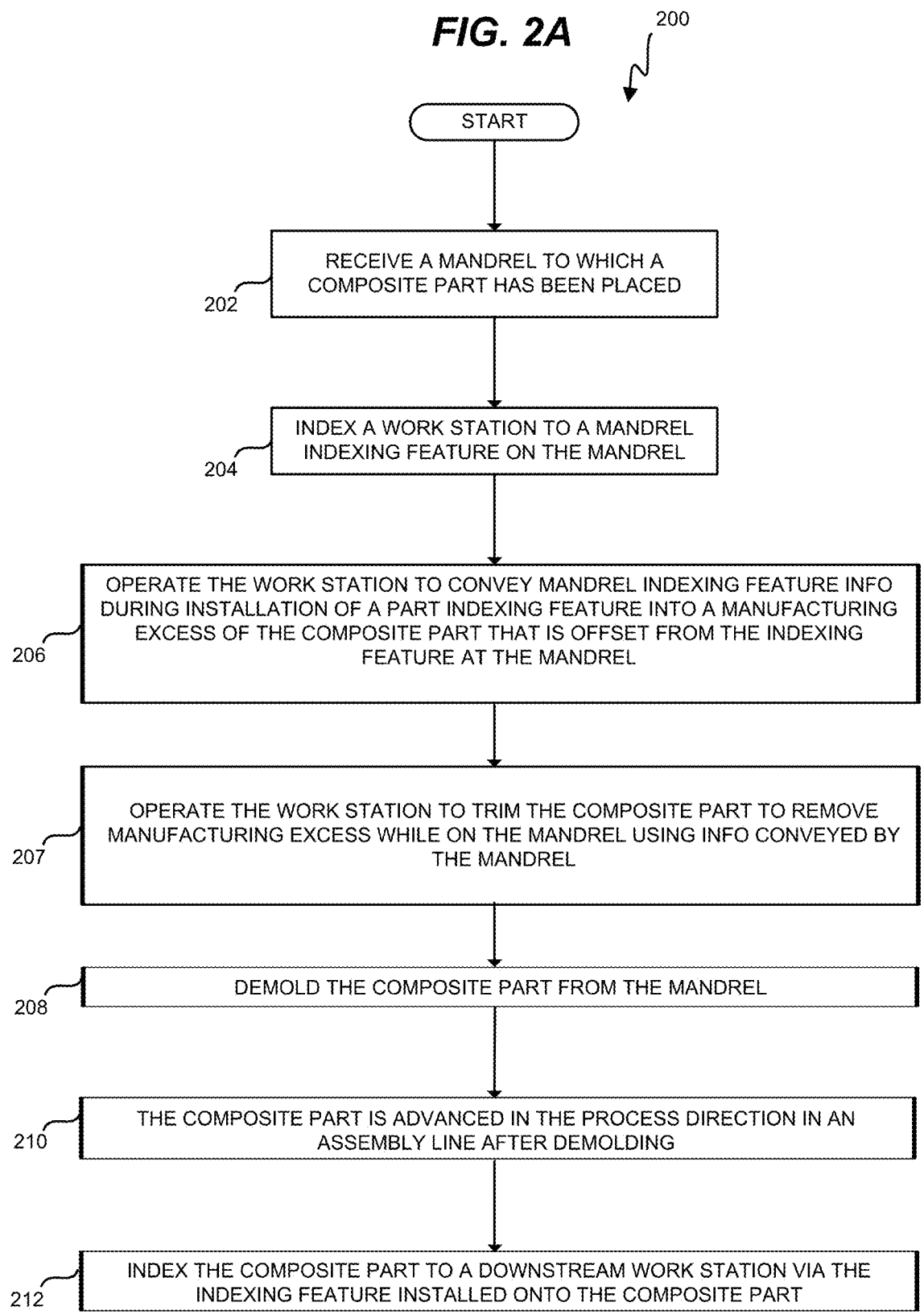

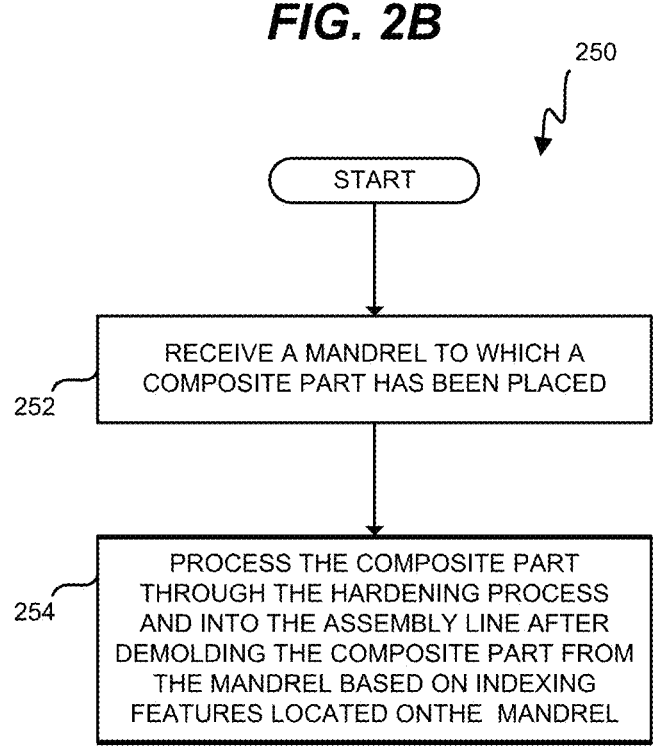

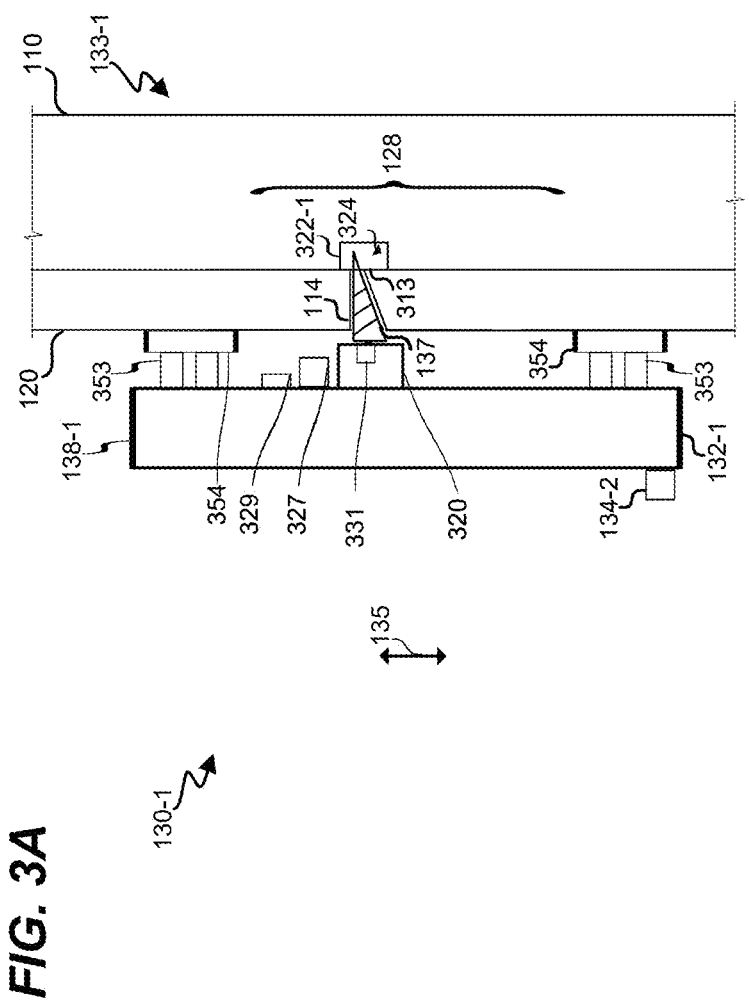

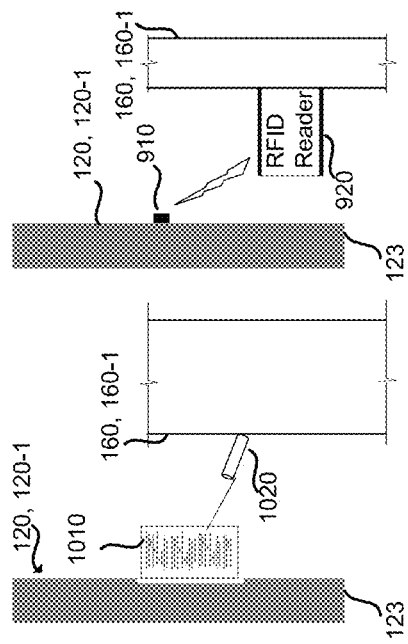
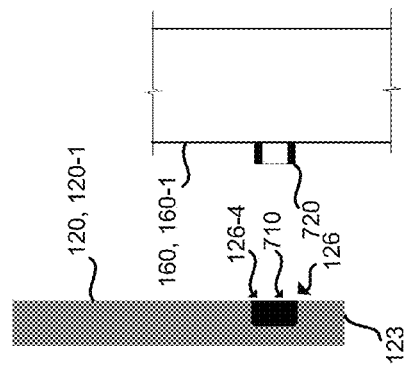
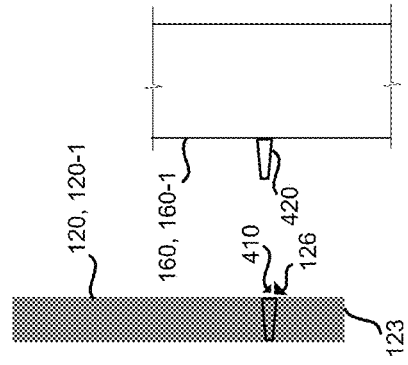

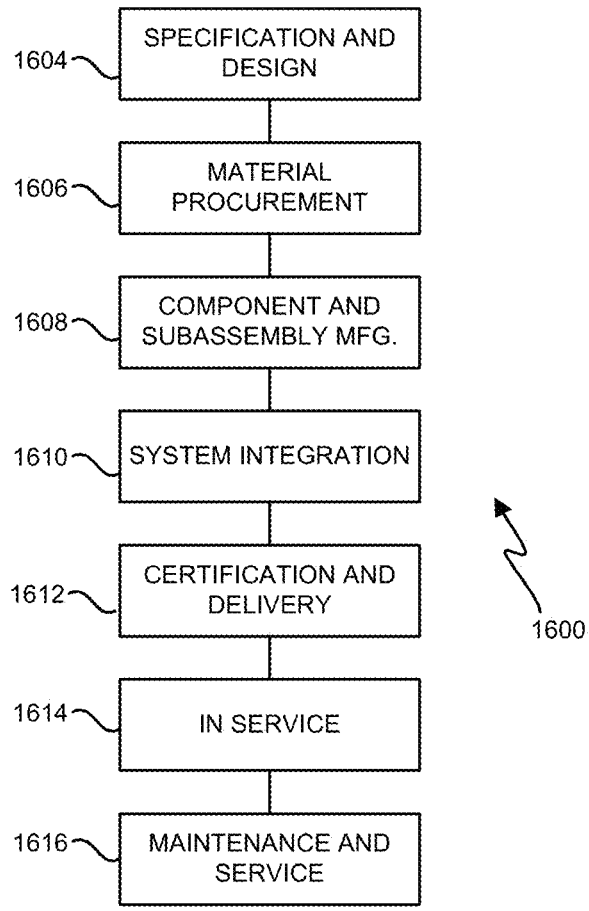
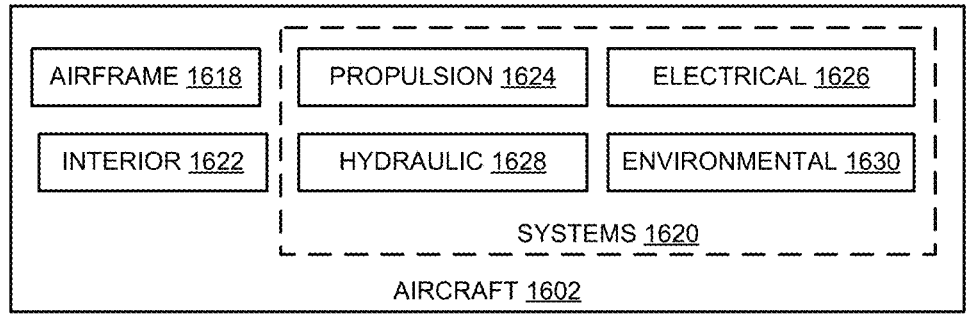

INSTALLATION OF INDEXING FEATURES ONTO COMPOSITE PARTS

CROSS-REFERENCE TO RELATED APPLICATION

This application claims the benefit of U.S. Provisional Patent Application Ser. No. 63/115,061, filed Nov. 18, 2020, and entitled "Installation of Indexing Features onto Composite Parts;" which is incorporated herein by reference in its entirety

FIELD

The disclosure relates to the field of aircraft, and in particular, to fabrication of aircraft components.

BACKGROUND

Large composite parts, such as those spanning tens of feet, occupy substantial space within a factory floor. Laminates for these parts are laid up on a mandrel in a stationary work cell. The mandrel is moved to another stationary work cell and the laminate is hardened into a composite part. Next, the composite part is separated from the mandrel. The manufacturing excess for a composite part is trimmed immediately after demolding. The composite part is then transported to a new stationary work cell to receive work, such as NDI inspection. Each time transportation occurs, the composite part must be aligned to the stationary work cell. Alignment to each stationary work cell adds time and complexity to the fabrication process.

Present techniques for fabricating large composite parts result in large parts that require substantial amounts of time to probe and inspect each time the composite parts are moved. Therefore, it would be desirable to have a method and apparatus that take into account at least some of the issues discussed above, as well as other possible issues.

SUMMARY

Embodiments described herein provide systems and methods for fabricating indexing features into a composite part that resides at a mandrel. The mandrel, being a rigid tool, is already machined to a desired level of precision. By following indexing features placed in the mandrel, a machine may rapidly apply indexing features precisely to a composite part hardened thereon. After the composite part is removed, its integral indexing features are utilized to rapidly the index the composite part to one or more stations that perform work on the composite part as the composite part moves in a process direction.

One embodiment is a method for preparing a composite part for assembly. The method includes receiving a mandrel to which a composite part has been molded, and operating a work station to install an indexing feature into a manufacturing excess of the composite part.

A further embodiment is a system for preparing a composite part for assembly. The system includes a mandrel that moves in a process direction while transporting a composite part. The mandrel comprises a layup surface for the composite part, and indexing features disposed at predetermined locations. The system further includes a work station that indexes to the indexing features at the mandrel, and that installs an indexing feature onto the composite part that is offset from the indexing feature at the mandrel, and a downstream work station that indexes to the indexing feature installed onto the composite part.

A further embodiment is a method for processing a composite part. The method includes receiving a mandrel to which a composite part has been molded, and processing the composite part based on indexing features located in the mandrel.

Yet another embodiment is a non-transitory computer readable medium embodying programmed instructions which, when executed by a processor, are operable for performing a method of preparing a composite part for assembly. The method includes receiving a mandrel to which a composite part has been molded, and operating a work station to install an indexing feature into a manufacturing excess of the composite part.

According to an aspect of the present disclosure, a method for preparing a composite part for assembly, the method comprising: placing a preform with a manufacturing excess upon a mandrel; hardening the preform into composite part with a hardened manufacturing excess while still upon mandrel; and installing an indexing feature into the manufacturing excess pre-hardening and/or post hardening prior to demolding from mandrel.

Advantageously, the method further comprising demolding the composite part from the mandrel advancing the composite part in a process direction and indexing the composite part to a downstream work station via the indexing feature installed into the composite part.

Preferably, the method further comprising operating a mandrel work station to install an indexing feature into the manufacturing excess of the composite part prior to demolding the composite part from the mandrel.

Preferably, the method further comprising separating flash edges from the composite part prior to demolding.

Preferably, the method further comprising indexing the mandrel work station to a mandrel indexing feature at the mandrel.

Preferably, the method wherein the indexing feature installed into the manufacturing excess of the composite part is offset from a mandrel indexing feature.

Preferably, the method wherein indexing the mandrel work station to the mandrel indexing feature at the mandrel comprises inserting a complementary key of the mandrel work station into a corresponding keyway at the mandrel.

Preferably, the method wherein the mandrel work station follows a groove at the mandrel.

Preferably, the method wherein the mandrel work station follows a track at the mandrel.

Preferably, the method wherein operating the mandrel work station to install the indexing feature comprises subtractive fabrication using drilling, milling or trimming or by additive fabrication such as adding pins adding RFID tags or adding bar codes.

Preferably, the method wherein the mandrel work station cuts through the composite part into a potted recess of the mandrel to install the indexing feature into composite part.

Preferably, the method wherein installing the indexing feature comprises installing a notch in the bearing edge and/or edge at the mandrel of the composite part.

Preferably, the method wherein installing the indexing feature comprises installing the indexing feature in a manufacturing excess selected from the group consisting of window manufacturing excess and/or door manufacturing excess, and antenna cut-out regions on the composite part.

Preferably, the method wherein operating the mandrel work station to install the indexing feature comprises installing multiple types of indexing features, wherein different types of indexing features are utilized by different downstream work stations.

Preferably, the method wherein the indexing features installed into the manufacturing excess of the composite part are selected from the group consisting of cup locating features, drill start locations, drill through locations, slots, installed pins RFID tags bar codes, formed indexing feature and notch.

Preferably, the method wherein the indexing features installed into the manufacturing excess of the composite part using mandrel indexing features selected from the group consisting of indents, protrusions, ridges, grooves, notches, through-holes, blind holes, RFID tags, and bar code.

A portion of an aircraft assembled according to the method as described above.

According to an aspect of the present disclosure, a system for preparing a composite part for assembly, the system comprising: a mandrel that comprises: a layup surface for the composite part; and mandrel indexing features disposed at the mandrel; and a mandrel work station that indexes to the mandrel indexing features, and that installs an indexing feature onto the composite part that is offset from the mandrel indexing feature.

Advantageously, the system wherein a downstream work station that indexes to the indexing feature.

Preferably, the system wherein a downstream work station receives the composite part after the composite part has been demolded from the mandrel.

Preferably, the system further comprising the mandrel moves in a process direction while transporting the composite part.

Preferably, the system wherein the mandrel work station comprises an indexing feature tool that cuts into the composite part without cutting through the composite part.

Preferably, the system wherein a complementary key of the mandrel work station inserted into a corresponding keyway at the mandrel to index the mandrel work station to the mandrel indexing feature.

Fabricating a portion of an aircraft using the system described above.

According to an aspect of the present disclosure, a method for processing a composite part, the method comprising: receiving a mandrel to which a composite part has been molded; and processing the composite part based on indexing features located on the mandrel.

Advantageously, the method wherein processing the composite part comprises installing indexing features into the composite part prior to demolding.

Preferably, the method further comprising processing the composite part comprises separating flash edges from the composite part prior to demolding.

Preferably, the method further comprising demolding the composite part from the mandrel advancing the composite part in a process direction and indexing the composite part to a downstream work station via the indexing feature installed into the composite part.

Preferably, the method further comprising operating a mandrel work station to install an indexing feature into the manufacturing excess of the composite part prior to demolding the composite part from the mandrel.

Preferably, the method further comprising indexing the mandrel work station to a mandrel indexing feature at the mandrel.

Preferably, the method further comprising the indexing feature installed into the manufacturing excess of the composite part is offset from the mandrel indexing feature at the mandrel.

Preferably, the method further comprising indexing the mandrel work station to the mandrel indexing feature at the mandrel comprises inserting a complementary key of the mandrel work station into a corresponding keyway at the mandrel.

Preferably, the method further comprising the mandrel work station follows a groove and/or track at the mandrel.

Preferably, the method further comprising operating the mandrel work station to install the indexing feature comprises cutting into the composite part without cutting through the composite part.

Preferably, the method further comprising the mandrel work station cuts through the composite part into a potted recess of the mandrel to install the indexing feature.

Preferably, the method further comprising installing the indexing feature comprises installing a notch in the bearing edge and/or edge at the mandrel of the composite part.

Preferably, the method further comprising installing the indexing feature comprises installing a notch in a bearing edge of the composite part.

Preferably, the method further comprising installing the indexing feature comprises installing the indexing feature in a manufacturing excess, window manufacturing excess and/or door manufacturing excess.

Preferably, the method further comprising removing the manufacturing excess from the composite part.

Preferably, the method further comprising operating the mandrel work station to install the indexing feature comprises installing multiple types of indexing features, wherein different types of indexing features are utilized by different downstream work stations.

Preferably, the method further comprising the indexing features installed into the manufacturing excess, window manufacturing excess and/or door manufacturing excess of the composite part are selected from the group consisting of cup locating features, drill start locations, drill through locations, slots, installed pins, RFID tags, bar codes, formed indexing feature and notch.

A portion of an aircraft assembled according to the method described above.

According to an aspect of the present disclosure, an apparatus for forming composite parts, the apparatus comprising: a mandrel defining a contour for a composite part, the mandrel comprising: potted recesses disposed in a layup region for the composite part, beneath locations providing a layup region for a manufacturing excess of the composite part; and an index contour feature disposed within the layup region.

Advantageously, the apparatus wherein the mandrel further comprises keyways disposed beyond the layup region.

Advantageously, the apparatus wherein the mandrel further comprises grooves disposed beyond the layup region that guide a mandrel work station.

Fabricating a portion of an aircraft using the apparatus described above.

According to an aspect of the present disclosure, a system for preparing a composite part for assembly, the system comprising: a mandrel that comprises a layup region for the composite part; a composite part placed upon the layup region; and mandrel indexing features disposed at the mandrel.

Advantageously, the system further comprising a mandrel work station that indexes to the mandrel indexing features.

Preferably, the system further comprising the mandrel work station installs an indexing feature onto the composite part that is offset from the mandrel indexing feature.

Preferably, the system further comprising a potted recess disposed in a layup region, beneath locations providing a layup region for a manufacturing excess of the composite part.

Preferably, the system further comprising the mandrel further comprises keyways disposed beyond the layup region.

Preferably, the system wherein the mandrel further comprises grooves disposed beyond the layup region that guide a mandrel work station.

Preferably, the system further comprising the flash edge and manufacturing excess is separated from the composite part prior to demolding.

Preferably, the system wherein the separated flash edge and separated manufacturing excess are collected in chute system.

Fabricating a portion of an aircraft using the system described above.

According to an aspect of the present disclosure, an indexing feature installer comprising: a mandrel work station; and a feature creator coupled to the mandrel work station.

Advantageously, the indexing feature installer further comprising a transmitter coupled to the mandrel work station.

Preferably, the indexing feature installer further comprising an indexing key coupled to the mandrel work station.

Preferably, the indexing feature installer further wherein the indexing key comprises a complementary key.

Preferably, the indexing feature installer wherein the feature creator is selected from the group consisting of a blade, a drill, a mill, a pin installer, an RFID tag installer, a bar code installer and a fastener installer.

Preferably, the indexing feature installer further wherein the mandrel work station is coupled to a mandrel.

Preferably, the indexing feature installer further wherein the mandrel work station is coupled to the mandrel by a groove in the mandrel.

Preferably, the indexing feature installer further wherein the mandrel work station is transportable relative to manufacturing excess by slide-ably engaging the groove.

Preferably, the indexing feature installer further wherein the mandrel work station is transportable relative to manufacturing excess by slide-ably engaging the groove via a roller system.

Preferably, the indexing feature installer further wherein the mandrel work station is coupled to the mandrel by a track on the mandrel.

Preferably, the indexing feature installer further wherein the mandrel work station is transportable relative to manufacturing excess by slide-ably engaging the track.

Preferably, the indexing feature installer wherein the mandrel work station is transportable relative to manufacturing excess by slide-ably engaging the track via a roller system.

Preferably, the indexing feature installer further comprising the complementary key configured to complementarily mate with a mandrel indexing feature.

Preferably, the indexing feature installer further comprising the blade selected from the group consisting of a reciprocating blade or a circular blade.

Preferably, the indexing feature installer wherein the mandrel work station comprising a controller.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 1 depicts an assembled aircraft in an illustrative embodiment, including illustration of sections of the fuselage.

FIG. 2A is a flowchart illustrating a method for applying indexing features to composite parts in an illustrative embodiment.

FIG. 2B is a flowchart illustrating a method for processing composite parts in an illustrative embodiment.

FIGS. 3A-3D depict a further machine for installing indexing features into a composite part in an illustrative embodiment.

FIGS. 4-5 are views of a composite part that includes indexing features installed by reference to indexing features at a mandrel in an illustrative embodiment.

FIGS. 6-7 are views of a keyway that mates with a key of a machine that installs indexing features in an illustrative embodiment.

FIGS. 9-13 are section cut views of the indexing features of FIG. 8 in an illustrative embodiment.

FIG. 15 is a flow diagram of aircraft production and service methodology in an illustrative embodiment.

FIG. 16 is a block diagram of an aircraft in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform or laminate. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1A:
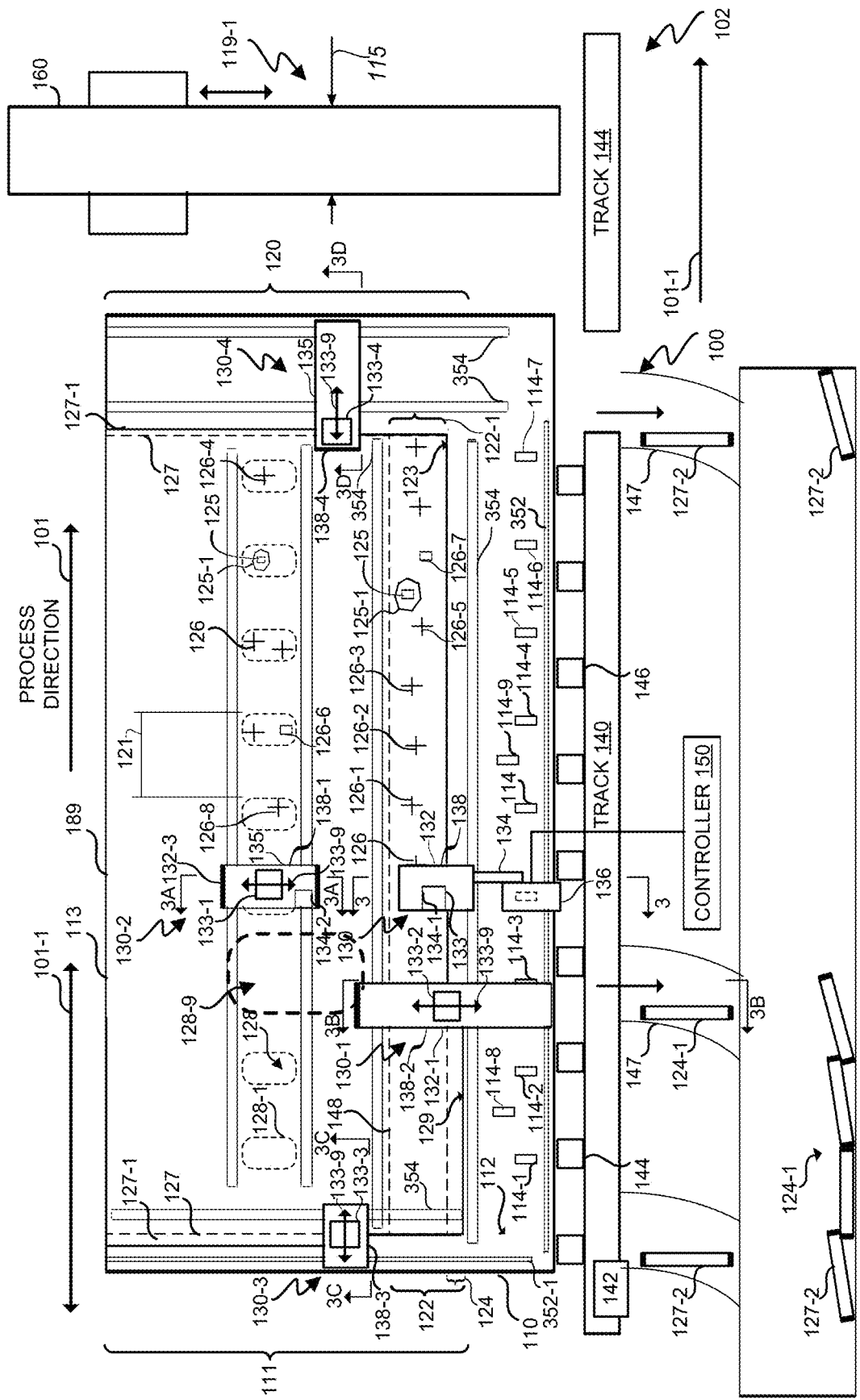
FIG. 1A is a block diagram of an assembly environment for installing indexing features into a half barrel section in an illustrative embodiment.

Turning now to FIG. 1, an illustration of an aircraft is depicted in which an illustrative embodiment may be implemented. Aircraft 10 is an example of an aircraft which can be formed using controller 150, of FIG. 1, 1A, respectively. Aircraft 10 is an example of an aircraft 10 which is formed of half barrel sections 24 of fuselage 12.

In this illustrative example, aircraft 10 has wing 15 and wing 16 attached to body 38. Aircraft 10 includes engine 14 attached to wing 15 and engine 14 attached to wing 16.

Body 38 has tail section 18. Horizontal stabilizer 20, horizontal stabilizer 21, and vertical stabilizer 22 are attached to tail section 18 of body 38.

Fuselage 12 is fabricated from half barrel sections 24 with an upper half barrel section 26 joined to a lower half barrel section 28 to form a full barrel section 29-1, 29-2, 29-3, 29-4, 29-n. There are n numbers of full barrel sections as illustrated by 29-n. The full barrel sections are joined serially, such as end to end, to form fuselage 12.

Figure 1B:
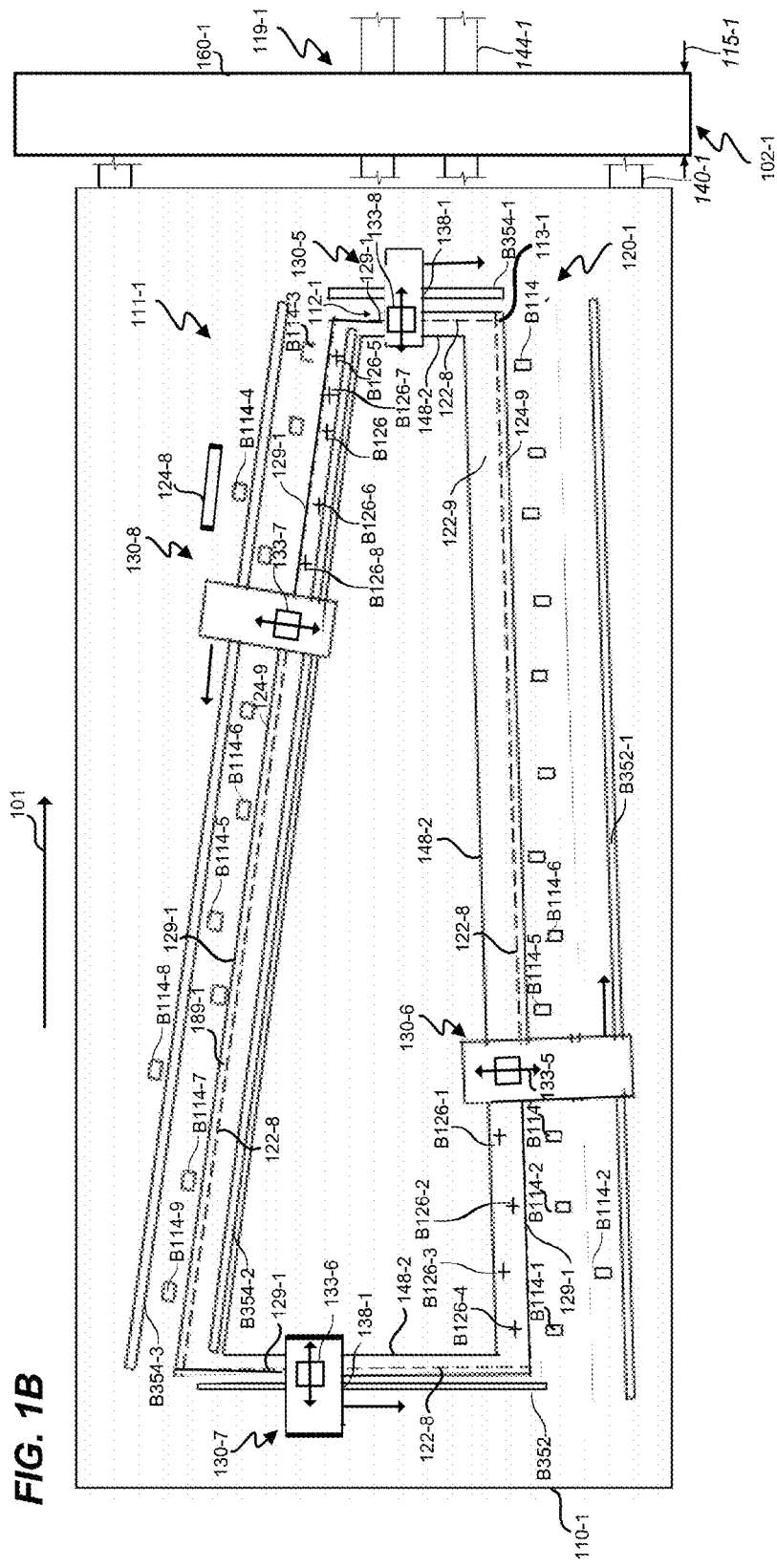
FIG. 1B is a block diagram of an assembly environment for installing indexing features into a wing panel in an illustrative embodiment.

Wing 15 and 16 are formed of wing panels 30 comprising upper wing panel 32 and a lower wing panel 34 joined together. Section cut 46 is a cut through wing panel 30 and corresponds to unhardened preform 189, 189-1 (FIGS. 1A and 1B). Section cut 46 is orientated chord wise roughly perpendicular to element 55-1.

Section cut 44 is a cut through composite part 55 and corresponds to half barrel section preform prior to hardening. Half barrel section preform corresponds to unhardened preform 189, 189-1. Section cut 44 is orientated longitudinally through a layup surface 112-1 along a stringer.

FIGS. 1A, 1B are block diagrams of a fabrication environment 100 for installing indexing features 126, B126 into and/or onto composite parts 120, 120-1 in an illustrative embodiment. In prior systems, manufacturing excess for a composite part is trimmed immediately after demolding. Fabrication environment 100 is unique in that it utilizes material during subsequent assembly that is traditionally immediately trimmed from a composite part 120, 120-1 after demolding. Fabrication environment 100 comprises any system, device, or component operable to install indexing features 126, B126 onto a composite part 120, 120-1 that resides on a layup surface 112, 112-1 (e.g., defining a curved or flat contour) in a layup region 111, 111-1 of a mandrel 110, 110-1 (e.g., a rigid tool, such as a steel tool, composite tool, Invar tool, aluminum tool, etc., that is capable of withstanding heat and pressure applied during hardening of the composite part 120, 120-1, such as a half barrel section 113 or wing panel 113-1). As used herein, an indexing feature 126, B126 comprises a physical, electrical, optical, or other sensory feature that is integrated into the mandrel or the composite part 120, 120-1, and characterizes a portion of the composite part 120, 120-1 (or mandrel) within the purview 115, 115-1 of a work station 160, 160-1.

The mandrel 110, 110-1 that carries the composite part 120, 120-1 proceeds in a process direction 101 during fabrication. In this embodiment, the mandrel 110, 110-1 proceeds along a track 140, 140-1 (e.g., a series of discrete stanchions having rollers, a rail or set of rails, etc.) during fabrication, and may be pulsed incrementally such as its entire length, several feet to several inches in the process direction 101, in what is known as a micro pulse 121. In further embodiments, the mandrel 110, 110-1 proceeds continuously in the process direction 101. The mandrel 110, 110-1 defines a contour for the placed composite part 120, 120-1, such as a half barrel section 113 of fuselage 12, or a wing panel 113-1 for a wing 15. A half barrel section preform is placed upon mandrel 110, 110-1 during layup and then is hardened into composite part 120, 120-1.

The mandrel 110, 110-1 has mandrel indexing features 114, B114, such as indents 114-1, B114-1, protrusions 114-2, B114-2, ridges 114-3, B114-3, grooves 114-4, B114-4, notches 114-5, B114-5, through-holes 114-6, B114-6, blind holes 114-7, B114-7, RFID tags 114-8, B114-8, bar code 114-9, B114-9, etc. While all of mandrel indexing features 114, 114-1 through 114-9 and B114, B114-1 through B114-9 are illustrated in FIG. 1, it is not uncommon to have only one or a couple types of mandrel indexing features 114, B114 used on each half barrel section 113 or on wing panel 113-1. While all of mandrel indexing features 114, 114-1 through 114-9 and B114, B114-1 through B114-9 are illustrated as rectangular, each mandrel indexing feature 114 has the shape commensurate with the shape of that mandrel index feature 114, B114, such as indents 114-1, B114-1, protrusions 114-2, B114-2, ridges 114-3, B114-3, grooves 114-4, B114-4, notches 114-5, B114-5, through-holes 114-6, B114-6, blind holes 114-7, B114-7, RFID tags 114-8, B114-8, bar code 114-9, B114-9. Mandrel indexing features 114, B114 are capable of being used directly to place indexing features 126, B126 onto the half barrel section 113 or wing panel 113-1 while others accommodate trimming of manufacturing excess 122, 122-9. The trimming of manufacturing excess 122, 122-9 creates separated flash edge 124-1, 124-8 from flash edge 124, 124-9 and creates bearing edge 123 and edge 129-1 at the mandrel 110, 110-1. Drilling and/or milling of the half barrel section 113 or wing panel 113-1 at the mandrel 110, 110-1 add indexing feature 126, B126 to composite part 120, 120-1, respectively. Separated flash edge 124-1, 124-8 and separated manufacturing excess 127-2 are collected in chute system 147. Chute system 147 facilitates removing the trimmed off materials, such as separated flash edge 124-1, 124-8 and separated manufacturing excess 127-2, from the removed material location prior to demold from the mandrel 110, 110-1. Further, index contour features 125 on mandrel 110, 110-1 are recesses, indents, dimple, bumps or ridges that are filled with resin and reinforcing fibers or displaces resin and reinforcing fibers, respectively, thus imparting a indexing feature 126-8, B126-8 into manufacturing excess 122-1, 122-9, 128 prior to hardening which is made permanent by the hardening process. FIG. 1A shows the index contour features 125 through cut through view 125-1 of manufacturing excess 122-1. Index contour features 125 on mandrel 110, 110-1 also convey indexing features 126, B126 into window manufacturing excess 128 and/or door manufacturing excess 128-9. Trim edge 128-1 remains after window manufacturing excess 128 is separated. Potted recesses 322, 322-1 (FIG. 3) are recesses 324 filled with potting compound and finished to a mandrel 110, 110-1 surface contour 313. Overshoot during drilling or trimming through composite part 120, 120-1 and into the mandrel 110, 110-1 into potted recess 322 and piercing surface contour 313 and result in a need to restore the surface contour 313 prior to the reuse of the mandrel 110, 110-1. That is, surface contour 313 of the mandrel 110, 110-1 after piercing due to drilling or cutting and surface contour 313 is restored to account for any overshoot in cuts or drilling that occurred prior to demold. Piercing of the surface contour 313 into potted recesses 322 during drilling, milling and/or trimming saves the mandrel and the drilling, milling and/or trimming device from unrepairable damage. Potted recess 322 is easily returned to surface contour 313 by adding potting compound. Actuators 330 and 340 adjust the position of the complementary key 310 and indexing feature tool 320.

A mandrel work station 130, 130-6, 130-7 aligns itself to mandrel indexing features 114 in mandrel 110, 110-1, which are precisely machined and located into the mandrel 110, 110-1. After alignment to the mandrel 110, 110-1, the mandrel work station 130, 130-6, 130-7 installs indexing features 126, B126 onto the composite part 120, 120-1. These indexing features 126, B126 are installed at locations on the composite part 120, 120-1 with the assistance of mandrel work station 130, 130-6, 130-7 and mandrel index feature 114, 114-1 through 114-9 and B114, B114-1 through B114-9. The indexing features 126 are installed at manufacturing excess 122-1 or within window manufacturing excess 128. The indexing features B126 are installed at manufacturing excess 122-9 or in other words between edge 129-1 and final trim 148, 148-2. The precision of the mandrel 110, 110-1 and the layup upon the mandrel 110, 110-1 is leveraged to locate the indexing features 126, B126 relative to composite part 120, 120-1 such as half barrel section 113 and/or 113-1. The composite part 120, 120-1 is precisely laid-up onto the mandrel 110, 110-1 during fabrication. Indexing feature 126, B126 carries the precision of the mandrel indexing features 114, B114 into the composite part 120, 120-1 and carries it through the post demold fabrication process until manufacturing excess 122-1, 122-9 and 128 are finally separated. The mandrel indexing features 114, B114 at the mandrel 110, 110-1 enable precise alignment of the mandrel work station 130, 130-6, 130-7 to the mandrel 110, 110-1. The indexing features 126, B126 facilitate indexing 119-1 of the composite part 120, 120-1 to downstream work stations 160, 160-1, such as work station 160, 160-1 after the composite part 120, 120-1 has been removed from the mandrel 110, 110-1. Indexing features 126, B126 comprise cup locating features 126-1, B126-1 for a cup and cone arrangement (FIG. 4), drill start locations 126-2, B126-2 (FIG. 5), drill through locations 126-3, B126-3 (FIG. 6), slots 126-4, B126-4 (FIG. 7), installed pins 126-5, B126-5 (FIG. 8), RFID tags 126-6, B126-6 (FIG. 9), bar codes 126-7, B126-7 (FIG. 10), formed indexing feature 126-8, B126-8 (FIG. 11), notch 126-9, B126-9 (FIG. 12). Installing the notch 126-9, B126-9 in the bearing edge 123, final trim edge 127 and/or edge 129-1 at the mandrel 110, 110-1 of the composite part (120, 120-1) to install an indexing feature 126, B126. While all of these indexing features are illustrated, typically only a plurality of the different types will be present on composite part 120, 120-1, such as half barrel section 113 or wing panel 113-1. Some of the mandrel indexing features 114, B114 of the mandrel 110, 110-1 are located beneath or beyond a final trim 129 of the composite part 120, 120-1, while the indexing features 126, B126 are installed above a bearing edge 123 or between edge 129-1 and final trim 148, 148-2 of the composite part 120, 120-1, respectively. Bearing edge 123 is an edge of the composite part 120, 120-1 that bears a weight of the composite part 120, 120-1 after demolding. Formed indexing feature 126-8, B126-8 is created during layup and hardening due to forming over an index contour feature 125 shaping the composite part 120, 120-1 before hardening occurs and which is made permanent by the hardening process. The formed indexing feature 126-8 is present in the hardened composite part 120, 120-1. Each indexing feature 126, B126 in the composite part 120, 120-1 may be common to (i.e., used by) one or more work stations 160, 160-1 at an assembly line 102, 102-1 after demolding, and the precision of each indexing feature 126 is tailored to a tolerance determined for the work station 160, 160-1 that utilizes the indexing feature 126, 126-1 through 126-8 and B126, B126-1 through B126-8. For example, work stations 160, 160-1 that require precision operations may require more tightly toleranced indexing features 126, B126. Furthermore, different arrangements, positions, or patterns of indexing features 126, B126 relative to half barrel section 113 or wing panel 113-1 can indicate instructions to be performed by work stations 160, 160-1, respectively. Mandrel work stations 130-6, 130-7 are block representations of mandrel work station 130. Mandrel work station 130-6 is also capable of creating separated flash edge 124-8. Mandrel work stations 130-6, 130-7 have the same capabilities as mandrel work station 130 and 130-6 except it traverses mandrel 110, 110-1 on track 354 without using groove 352. Another possibility is to have the mandrel work station 130-6 and mandrel work station 130-7 carried along upon both a track 354 and a groove 352 to trim along final trim 148, 148-2 and to install indexing features B126. Another possibility is to have the mandrel work station 130 installing the indexing features 126 and also cutting the bearing edge 123 in a single work station in a single or multiple passes along mandrel 110, 110-1. Indexing features 126 through 126-8 and indexing features B126 through B126-8 are coupled to composite part 120, 120-1, respectively, by subtractive fabrication using drilling, milling or trimming or by additive fabrication such as adding pins 126-5, B126-5, adding RFID tags 126-6, B126-6, or adding bar codes 126-7, B126-7. While each mandrel work station 130-5, 130-6, 130-7, 130-8 type is shown along one edge only, it is possible to have one type of the work stations serving multiple edges. Four mandrel work stations 130-5 can service each of the four edges or two mandrel work stations 130-6 and two mandrel work stations 130-7 could each work an edge or three four mandrel work stations 130-8 could each work an edge and a mandrel work stations 130-5 can work an edge. Therefore, any combination of mandrel work stations 130-5, 130-6, 130-7, 130-8 are able to be used to service a particular edge.

In further embodiments, mandrel indexing features 114, B114 are implemented as radio frequency identification (RFID) tags 114-8, B114-8 that are coupled to the mandrel 110, 110-1. In such embodiments, mandrel work stations 130, 130-6, 130-7 interact with information provided by the mandrel indexing features 114, B114 to characterize the mandrel 110, 110-1, and use this information to determine locations for receiving indexing features 126, B126. In still further embodiments, the mandrel work station 130, 130-6, 130-7 installs indexing features 126, B126 in the form of RFID tags 114-8 that each characterize a portion of the composite part 120, 120-1 within the purview 115, 115-1 of work station 160, 160-1.

After hardening, the composite part 120, 120-1 is rough-trimmed to form a bearing edge 123 of the manufacturing excess 122-1. For example, rough-trimming may remove the flash edge 124, such as the rough edge of the layup including portions with resin and reinforcing fibers or just one or the other, from the composite part 120. The rough trimming creates the bearing edge 123 and edge 129-1 prior to demold from mandrel 110, 110-1. The removed material is a separated flash edge 124-1, 124-8 from manufacturing excess 122, 122-9. Window manufacturing excess 128 are typically removed after installation of window surrounds, and windows are installed at a downstream work station 160, 160-1. While illustrated as being installed in manufacturing excess 122, 122-9, in further embodiments, the indexing features 126, B126 are installed into other forms of manufacturing excess, such as window manufacturing excess 128 door cut-out regions (not shown), or antenna cut-out regions (not shown).

Mandrel work station 130, 130-6, 130-7 includes a feature creator 132, such as blade 137, drill, mill, pin installer, RFID tag installer, bar code installer, fastener installer or other machine tool to install the indexing features 126, B126 by removing material, adding material or scannable device to the composite part 120, 120-1. Looking at FIGS. 1A, 1B and FIG. 3, the feature creator 132 trims portions of a composite part 120, 120-1 that is disposed at the mandrel 110, 110-1. The cutting operation is typically performed prior to demolding of the composite part 120, 120-1 from the mandrel 110, 110-1, and leaves a sufficient amount of manufacturing excess 122-1, 122-9 to include indexing features 126, B126 and bearing edge 123 for use by work stations 160, 160-1 in an assembly line 102, 102-1, respectively. Feature creator 132 is employed to apply a preliminary cut that provides a bearing edge 123 or edge 129-1 to the composite part 120, 120-1 during the manufacturing process, prior to trimming the edge to a final trim 148, 148-2. Cutter 133 provides all of the trimming, milling or drilling to create separated flash edge 124-1, 124-8 from manufacturing excess 122-1, 122-9. Trimming prior to demold saves the non-value added time of placing the composite part 120, 120-1, such as half barrel section 113 and/or wing panel 113-1, into a cell dedicated only to trimming the composite part 120, 120-1. In the dedicated cell scenario, the composite part 120, 120-1 is indexed to the cell and the trimming equipment including the cutter prior to trimming to produce a final trim and then indexing the composite structure 120, 120-1 to each successive cell in a repetitive process to scan the part perimeter and contour. Using the manufacturing excess 122-1 and 128 to convey indexing features 126 saves much if not all of the repetitive part perimeter and contour scan-able process when moving from work station to work station through the assembly process. Also, using the bearing edge 123 as part of the transport process in assembly line 102, 102-1 protects the final trim 148, 148-2 edge from bump damage until manufacturing excess 122-1, including bearing edge 123 and manufacturing excess 122-9 is separated. Any damage to bearing edge 123, particularly after demolding, can be rough patched to restore transportation capabilities on assembly line 102 as needed before being trimmed off with manufacturing excess 122-1.

Figure 3:
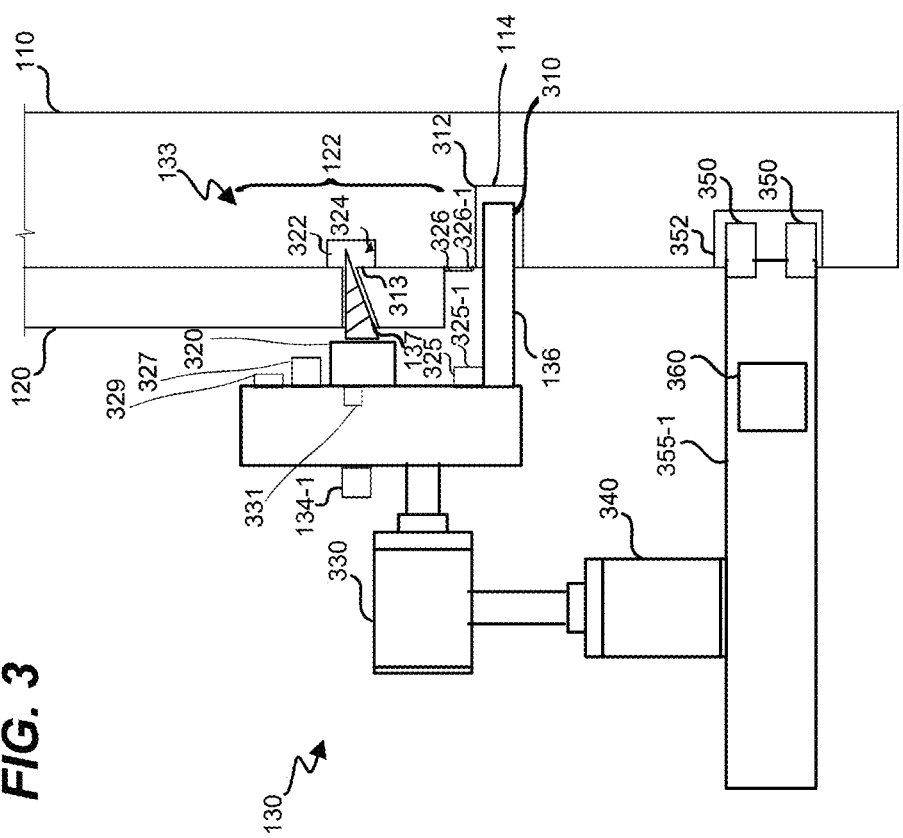
FIG. 3 depicts a machine for installing indexing features into a composite part in an illustrative embodiment.

Mandrel work station 130 further comprises a support 134 (e.g., a rigid bar, an actuated linkage such as a robot arm, kinematic chain, or other component, etc.) that is capable of aligning the feature creator 132 in position. Mandrel work stations 130-6, 130-7 are block representations of mandrel work station 130. Mandrel work stations 130-6, 130-7 have the same capabilities as mandrel work station 130 and 130-6 except it traverses mandrel 110, 110-1 on track 354 without using groove 352. Another possibility is to have the mandrel work station 130-6 and mandrel work station 130-7 carried along upon both a track 354 and a groove 352 to trim along final trim 148, 148-2 and to install indexing features B126. Another possibility is to have the mandrel work station 130 installing the indexing features 126 and also cutting the bearing edge 123 in a single work station in a single or multiple passes along mandrel 110, 110-1. Mandrel work station 130 still further comprises indexing key 136, which complementarily mates with mandrel indexing features 114, such as indents 114-1, protrusions 114-2, ridges 114-3, grooves 114-4, notches 114-5, through-holes 114-6, blind holes 114-7 to lock the feature creator 132 in place relative to the mandrel 110, 110-1. Mandrel work station 130, through 130-8 comprises an indexing feature installer and indexing key 136. The complementary mating of the indexing key 136 with the indents 114-1, protrusions 114-2, ridges 114-3, grooves 114-4, notches 114-5, through-holes 114-6, blind holes 114-7 conveys a message from the mandrel 110, 110-1 regarding placement and type of indexing feature 126 relative to composite part 120, 120-1. The mandrel work station 130 places the message conveyed by the mating of the indexing key 136 from the mandrel indexing feature 114 into operation to locate and install the indexing features 126, 126-1 through 126-8 and B126, B126-1 through B126-8 into or onto manufacturing excess 122-1. In one embodiment, mandrel work station 130 includes a blade 137, such as a reciprocating or circular blade, and/or a mill and/or a drill and a control system that drives the blade 137 to trim, mill or drill portions of a composite part 120, 120-1 at the mandrel 110, 110-1. This trimming, milling or drilling operation are performed prior to demolding of the composite part 120, 120-1 from the mandrel 110, 110-1, and leaves indexing features 126, B126 including cup locating features 126-1, B126-1 for a cup and cone arrangement, drill start locations 126-2, B126-2, drill through locations 126-3, B126-3, slots 126-4, B126-4, installed pins 126-5, B126-5 for use by work stations 160, 160 in an assembly line 102, 102-1. The RFID tags 126-6, and bar codes 126-7 are also placed by the mandrel work station 130. RFID tags 114-8 and bar code 114-9 are placed RFID tags and/or bar code placer 329 (FIG. 3-3D).

Groove 352 is used to guide and for transport of the cutter 133 relative to manufacturing excess 122-1, 128 with support 355-1 slide-ably engaging it with roller system 350-1. This embodiment is cantilever mounted into groove 352 and is guided along groove 352 to facilitate installing indexing features 126, 126-1 through 126-8 and B126, B126-1 through B126-8 into manufacturing excess 122-1, 128. The cutter 133 is cantilevered from groove 352 with one or more roller systems 350 slide-ably engaging and propelling the cutter 133 along mandrel 110, 110-1 to facilitate creating indexing features 126, 126-1 through 126-8 and B126, B126-1 through B126-8. The mandrel indexing features 114, such as indents 114-1, protrusions 114-2, ridges 114-3, grooves 114-4, notches 114-5, through-holes 114-6, blind holes 114-7, RFID tags 114-8, bar code 114-9 are engaged by indexing key 136 such as a complementary key 310 (FIG. 3) and/or RFID tag reader 325 and/or bar code reader 325-1 that can function with tag 326 and/ir code 326-1. Installed pins 126-5 are placed by pin installer 327 (FIG. 3 and FIG. 3D) into the hole created by blade 137 (FIG. 3A). Mandrel work station 130, through 130-8 comprises an indexing feature installer and complementary key 310. A cutter 133 has a transverse mount 133-9 travelling in transverse direction 135 to the feature creator 132. The cutter 133 includes the blade 137 which is a reciprocating blade or a circular blade or a mill type cutter blade to separate flash edge 124, 124-9 and create bearing edge 123 or edge 129-1, respectively. The transverse mount 133-9 travelling in transverse direction 135 of the cutter 133 comes into play when locating indexing features 126 in a transverse direction 135 relative to track 354. This can be accomplished by using the same cutter 133-1 to install index features 126, B126 into manufacturing excess 122, 122-9 at different distances from bearing edge 123 and/or edge 129-1. The complementary key 310 complementarily engages with mandrel indexing feature 114, such as indents 114-1, protrusions 114-2, ridges 114-3, grooves 114-4, notches 114-5, through-holes 114-6, blind holes 114-7, RFID tags 114-8, and bar code 114-9. Indexing the mandrel work station 130 to the mandrel indexing feature 114 at the mandrel 110, 110-1 comprises inserting a complementary key 310 of the mandrel work station 130 into a corresponding keyway 312 at the mandrel 110, 110-1. Mandrel work station 130, through 130-8 comprises an indexing feature installer and keyway 312.

The wheels that can be an embodiment of roller systems 350 enable longitudinal 101-1 movement relative to mandrel 110, 110-1 along groove 352 to the next in mandrel indexing features 114, and the complementary key 310 facilitates fine alignment of the indexing feature tool 320 to mandrel indexing features 114, such as indents 114-1, protrusions 114-2, ridges 114-3, grooves 114-4, notches 114-5, through-holes 114-6, blind holes 114-7 when complementary key 310 mates to mandrel indexing feature 114. Sensor 331 senses the mandrel indexing features 114, such as indents 114-1, protrusions 114-2, ridges 114-3, grooves 114-4, notches 114-5, through-holes 114-6, blind holes 114-7 and rough positions the mandrel work station 130 such that complementary key 310 is mate-able with mandrel indexing feature 114. The sensor 331 is an optical sensor or some other type of sensor that detects mandrel indexing feature 114. The mandrel 110, 110-1 indexing feature 114, such as RFID tags 114-8, bar code 114-9 conveys the locations of the mandrel indexing features 114 to mandrel work station 130 to help with locating each and then using the sensor 331 to mate the complementary key 310 with the mandrel indexing feature 114. An embodiment has groove 352 engaging with roller systems 350 in a rack and pinion arrangement that can also be used to convey position data relative to mandrel 110, 110-1 and/or propel the mandrel work station 130 relative to mandrel 110, 110-1. Thus, in one embodiment the mandrel work station 130 follows one or more grooves 352 at the mandrel 110, 110-1, pausing and mating with mandrel indexing features 114. Other embodiments of mandrel work station 130 use multiple tracks 354 with groove 352 or multiple tracks 354 only without groove 352.

A flex track type of device with a cutter moveably attached to two tracks removably attached to the composite part 120, 120-1 such as half barrel section 113. The tracks 354 are shown removably attached to composite part 120, 120-1 such as half barrel section 113 and mandrel 110, 110-1. The tracks 354 are vacuum coupled or by some other means of removable attaching to composite part 120, 120-1. The housing 138 spans between the track 354 and groove 352 and transports along the track 354 and groove 352. A cutter 133 has a transverse mount 133-9 travelling in transverse direction 135 to the feature creator 132. The cutter 133 includes the blade 137 which is a reciprocating blade or a circular blade or a mill type cutter blade to separate flash edge 124, 124-9 and create bearing edge 123 and edge 129-1. The transverse mount 133-9 travelling in transverse direction 135 of the cutter 133 comes into play when locating indexing features 126 in a transverse direction relative to track 354. An embodiment of the roller system 353 has a rack and pinion connection between the feature creator 132 and the tracks 354. An embodiment has a rack and pinion connection between the feature creator 132 and the groove 352. Another embodiment has the mandrel work station 130 carried directly upon track 140.

Looking at FIG. 1A and FIG. 3A, mandrel work station 130-1 includes a feature creator 132-1, such as blade, drill, mill, pin installer, RFID tag installer, bar code installer or fastener installer other machine tool to install the indexing features 126 by removing material, adding material or scannable device to the composite part 120, 120-1. The feature creator 132-1 trims portions of a composite part 120, 120-1 that is disposed at the mandrel 110, 110-1. The cutting operation is typically performed prior to demolding of the composite part 120, 120-1 from the mandrel 110, 110-1, and places an indexing features 126 in manufacturing excess 128 for use by work stations 160, 160-1 in an assembly line 102, 102-1. Trimming prior to demold saves the non-value added time of placing the composite part 120, 120-1 such as half barrel section 113 into a cell dedicated to only trimming and indexing to the cell and the cutter prior to trimming to a production perimeter and then indexing the composite structure 120, 120-1 to each successive cell in a repetitive part perimeter and contour scan-able process. Using the manufacturing excess 128 to convey indexing features 126 saves much if not all of the repetitive part perimeter and contour scan-able process time when moving through the assembly process from work station to work station.

Mandrel work station 130-2 further comprises a receiver 134-2 that receives coordinating information from mandrel work station 130 transmitter 134-1. Mandrel work station 130 comprises indexing key 136 and specifically complementary key 310, which complementarily mates with mandrel indexing features 114, such as indents 114-1, protrusions 114-2, ridges 114-3, grooves 114-4, notches 114-5, through-holes 114-6, blind holes 114-7 to lock the feature creator 132 in place relative to the mandrel 110, 110-1. The complementary mating of the complementary key 310 with the indents 114-1, protrusions 114-2, ridges 114-3, grooves 114-4, notches 114-5, through-holes 114-6, blind holes 114-7 conveys a message from the mandrel 110, 110-1 regarding placement and type of indexing feature 126. The mandrel work station 130 transmits the message, via transmitter 134-1 to receiver 134-2 conveyed by the mating of the complementary key 310 with the mandrel indexing feature 114 into operation to locate and install the indexing features 126, 126-1 through 126-8 and B126, B126-1 through B126-8 into or onto manufacturing excess 128. In one embodiment, mandrel work station 130-1 includes a blade 137, such as a reciprocating or circular blade, and/or a mill and/or a drill and a controller 150 that drives the blade 137 to trim, mill or drill portions of manufacturing excess 128 at the mandrel 110, 110-1 to install indexing feature 126, 126-1 through 126-7. This trimming, milling or drilling operation are performed in manufacturing excess 128 prior to demolding of the composite part 120 from the mandrel 110, 110-1, and leaves indexing features 126, locating features 126-1, drill start locations 126-2, drill through locations 126-3, slots 126-4, installed pins 126-5 for use by work stations 160, 160-1 in an assembly line 102, 102-1. The RFID tags 126-6 and bar codes 126-7 are also placed by the mandrel work station 130. RFID tags 114-8 and bar code 114-9 are placed RFID tags and/or bar code placer 329.

A flex track type of device with a cutter moveably attached to two tracks removably attached to the composite part 120, 120-1 such as half barrel section 113. The tracks 354 are shown removably attached to composite part 120, 120-1 such as half barrel section 113 and mandrel 110, 110-1. The tracks 354 are vacuum coupled or by some other means of removable attaching to composite part 120, 120-1. The housing 138-1 spans between the tracks 354 and transports along the track 354 by a roller system 353 and/or also couples the tracks 354 to housing 138-1. A cutter 133-1 has a transverse mount 133-9 travelling in transverse direction 135 to the feature creator 132-1. The cutter 133-1 includes the blade 137 which is a reciprocating blade or a circular blade or a mill type cutter blade to separate flash edge 124, 124-9 and create bearing edge 123 or edge 129-1, respectively. The transverse mount 133-9 travelling in transverse direction 135 of the cutter 133-3 comes into play when locating indexing features 126 in a transverse direction relative to track 354. This can be accomplished by using the same cutter 133-1 to install index features 126 into manufacturing excess 128 at different distances from bearing edge 123. An embodiment of the roller system 353 has a rack and pinion connection between the feature creator 132-1 and the tracks 354.

Figure 3B:
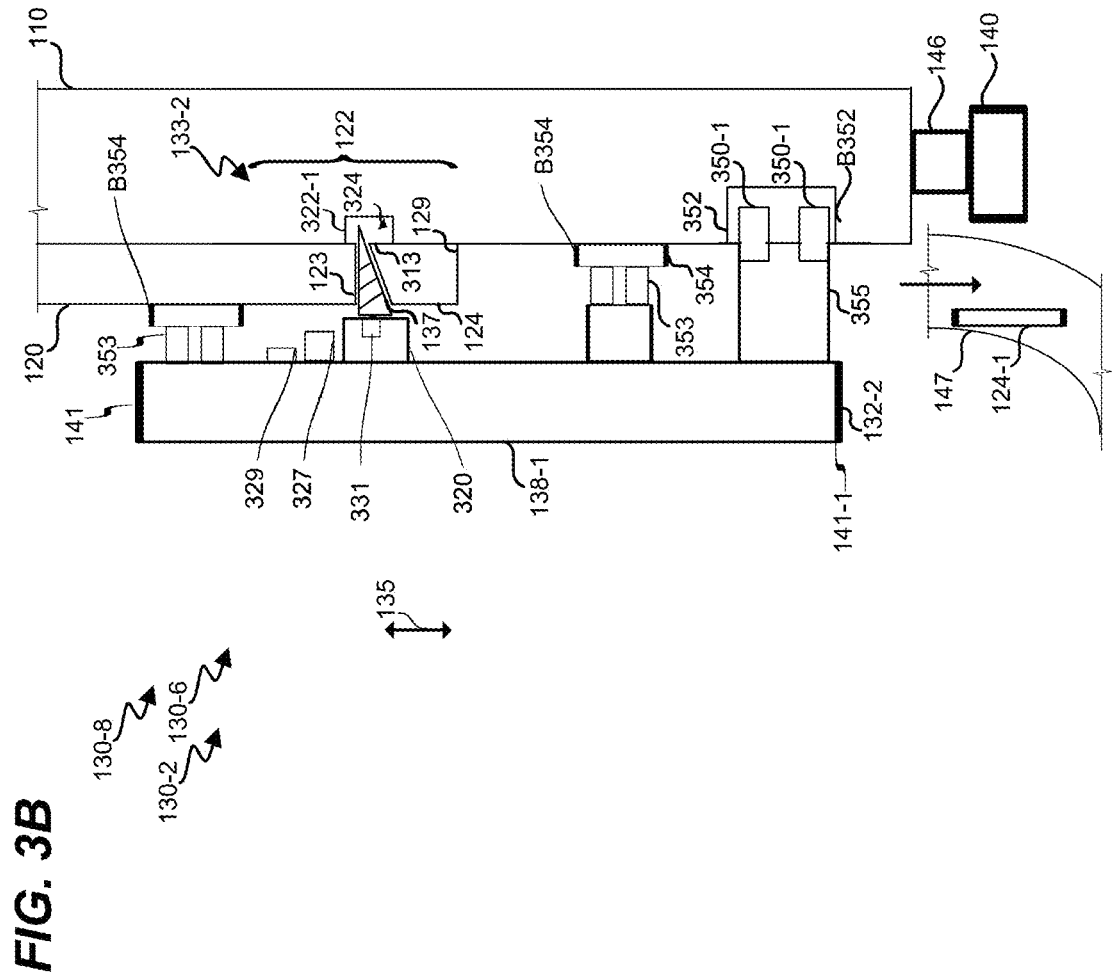

Looking at FIGS. 1A, 1B and FIG. 3B, mandrel work station 130-2 includes a cutter 133-2 with a blade 137, such as blade, drill, mill, to create separated manufacturing excess 124-1 from manufacturing excess 122-1 and bearing edge 123. The cutting operation is typically performed prior to demolding the composite part 120, 120-1 from the mandrel 110, 110-1, and leaves a sufficient amount of manufacturing excess 122-1 to include indexing features 126 for use by work stations 160, 160-1 in an assembly line 102, 102-1. The trimming also creates the bearing edge 123 used to transport composite part 120, 120-1 on track 140 through work stations 160, 160-1 on assembly line 102, 102-1. Trimming prior to demold saves the non-value added time of placing the composite part 120, 120-1, such as half barrel section 113, into a cell dedicated to only trimming and indexing to the cell and indexing to an edge 129-1 final trim 148, 148-2 trim line 122-8 prior to trimming to a final trim 148, 148-2 and then indexing the composite part 120, 120-1 to each successive cell in a repetitive part perimeter and contour scan-able process. Using the manufacturing excess 122-1 to convey indexing features 126 saves much if not all of the repetitive part perimeter and contour scan-able process time needed to index to each cell when moving through the assembly process.

Groove 352 is used to guide and enable longitudinal 101-1 transport of the cutter 133-2 relative to manufacturing excess 122-1 with support 355-1 slide-ably engaging it with roller system 350-1. A version of mandrel work station 130-2, 130-8 is cantilever mounted into groove 352. The mandrel work station 130-2 is guided along groove 352 to facilitate creating separated flash edge 124-1 from manufacturing excess 122. The cutter 133-2 is cantilevered from groove 352 with one or more roller systems 350 slide-ably engaging and propelling the cutter 133-2 along mandrel 110, 110-1. Groove 352 is illustrated having a rectangular cross section, but other cross sections are possible. The groove 352 also provides cutter 133-2 guidance during the creation of bearing edge 123. In another version, the track 354 as well as groove 352 is used to enable longitudinal 101-1 transport of the cutter 133-2 relative to manufacturing excess 122-1. In yet another version, the track 354 instead of groove 352 is used to enable longitudinal 101-1 movement.

This means that the roller systems 350 enable longitudinal 101-1 movement relative to mandrel 110, 110-1 along groove 352 relative to bearing edge 123 and trim line 122-8 from one end of mandrel 110, 110-1 to the other. A version has groove 352 engaging with roller systems 350 in a rack and pinion arrangement that can also be used to convey position data relative to mandrel 110, 110-1 and/or propel the mandrel work station 130-2 relative to mandrel 110, 110-1. Thus, in one embodiment the mandrel work station 130-2 follows one or more grooves 352 at the mandrel 110, 110-1. In another embodiment, as shown, one end 141 of the feature creator 132 is coupled via roller system 353 and track 354 to composite part 120, 120-1 as part of a flex track type of device and the other end 141-1 of the feature creator 132 is coupled via support 355 and roller system 350-1 to groove 352. In yet another embodiment, as shown, one end 141 of the feature creator 132 is coupled via roller system 353 and track 354 to composite part 120, 120-1 as part of a flex track type of device and the other end 141-1 of the feature creator 132 is coupled via roller system 353 and track 354, 354 to mandrel 110, 110-1 as part of a flex track type of device without using a connection to groove 352. In still another embodiment, as shown, one end 141 of the feature creator 132 is coupled via roller system 353 and track 354 to composite part 120, 120-1 as part of a flex track type of device and the other end 141-1 of the feature creator 132 is coupled via roller system 353 and track 354 to mandrel 110, 110-1 as part of a flex track type of device and other end 141-1 of the feature creator 132 is coupled via support 355 and roller system 350-1 to groove 352.

A flex track type of device with a cutter moveably attached to two tracks removably attached to the composite part 120, 120-1 such as half barrel section 113. The tracks 354 are shown removably attached to composite part 120, 120-1 and mandrel 110, 110-1. The tracks 354 are vacuum coupled or by some other means of removable attaching to composite part 120, 120-1 and/or mandrel 110, 110-1. The cutter housing 138-2 spans between the tracks 354 and transports along the track 354 by a roller system 353 and/or also couples the tracks 354 to cutter housing 138-2. A cutter 133-1 has a transverse mount 133-9 travelling in transverse direction 135 to the feature creator 132. The cutter 133-2 includes the blade 137 which is a reciprocating blade or a circular blade or a mill type cutter blade to separate manufacturing excess 124 and create bearing edge 123. The transverse mount 133-9 travelling in transverse direction 135 of the cutter 133-2 comes into play within feature creator 132 when locating indexing features 126 in a transverse direction relative to track 354. This can be accomplished by using the same cutter 133-2 to create bearing edge 123. An embodiment of the roller system 353 has a rack and pinion connection between the feature creator 132 and the tracks 354. Groove 352 is used to guide cutter 133-2 relative to bearing edge 123 and for transport of the cutter 133-3 relative to manufacturing excess 122-1, 128 with support 355-1 slide-ably engaging it with roller system 350-1. This embodiment is cantilever mounted into and guided along groove 352-1 to facilitate creating bearing edge 123 within manufacturing excess 122. The cutter 133-2 is cantilevered from groove 352 with one or more roller systems 350 slide-ably engaging and propelling the cutter 133-2 along mandrel 110, 110-1 either autonomously or manually.

Groove 352-1 in another embodiment is used to guide the cutter 133-2 relative to bearing edge 123 with support 355 slide-ably engaging it with roller system 350-1. This embodiment does not use tracks 354 and roller system 353, but is instead cantilever mounted into groove 352 and is guided along groove 352-1 to facilitate cutting bearing edge 123. The feature creator 132 and cutter 133-3 is cantilevered from groove 352-1 with one or more roller systems 350-1 slide-ably engaging and propelling the feature creator 132 and cutter 133-2 along mandrel 110, 110-1 to facilitate creating bearing edge 123. This may result in a rougher cut than for final trim and provides a consistent bearing edge 123 to the composite part 120, 120-1 for use during the manufacturing process, prior to trimming off the bearing edge 123 to a final trim 148.

Figure 3C:
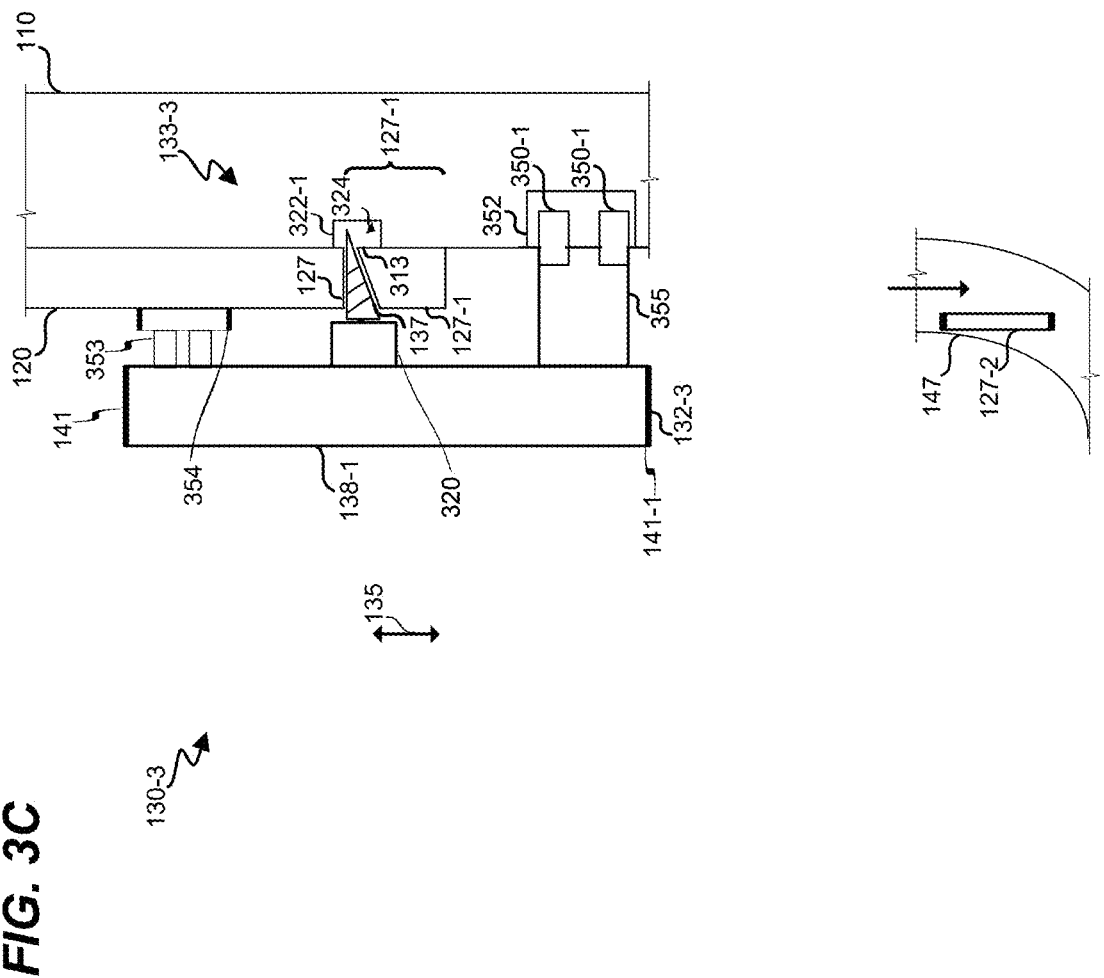
Figure 3D:
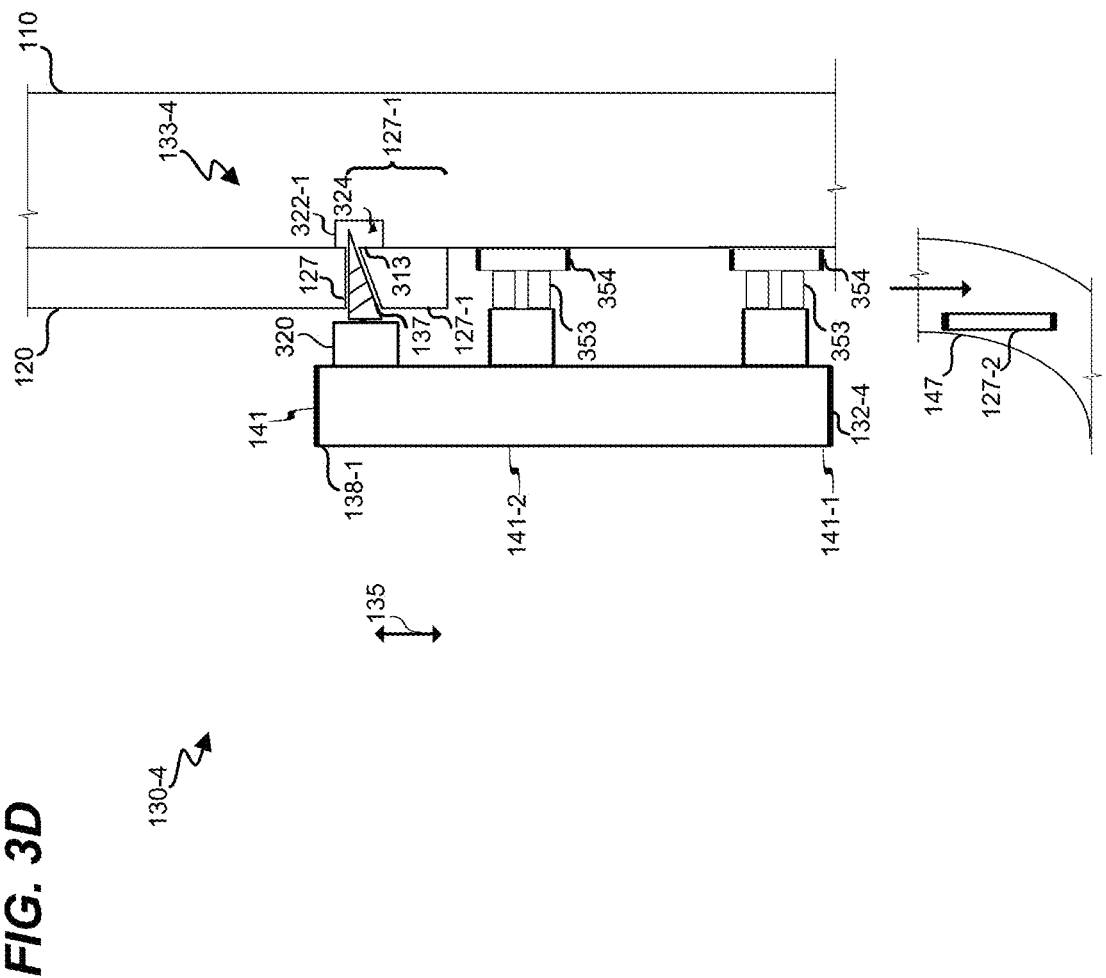

Looking at FIGS. 1A, 1B and FIG. 3C, mandrel work station 130-3 and mandrel work stations 130-5, 130-7 includes a cutter 133-3, 133-6, 133-7, 133-8 with a blade 137, such as blade, drill and/or mill, to create separated flash edge 127-2, 124-8 from manufacturing edge 127-1, trim line 122-8 leaving final trim edge 127, or edge 129-1, respectively. The cutting operation is typically performed prior to demolding of the composite part 120, 120-1 from the mandrel 110, 110-1, and creating a final trim edge 127 or edge 129-1 prior to processing through work stations 160, 160-1 in an assembly line 102, 102-1. Trimming prior to demold saves the non-value added time of placing the composite part 120, 120-1 into a cell dedicated to only trimming and indexing to the cell and indexing to a edge 129-1 final trim 148, 148-2 trim line 122-8 prior to trimming to a final trim 148, 148-2 and then indexing the composite structure 120, 120-1 to each successive cell in a repetitive part perimeter and contour scan-able process prior to beginning work in the cell. Using the manufacturing excess 122-1, 122-9 to convey indexing features 126, B126 saves much if not all of the repetitive part perimeter and contour scan-able process time needed to index to each cell when moving through the assembly process.

Mandrel work stations 130-5 and mandrel work stations 130-7 correspond to mandrel work station 130-3 and trims off flash edge 124-9 in a manner similar to flash edge 124. Mandrel work stations 130-5, 130-7 could be substituted for by mandrel work station 130-3 in some versions depending upon location, or lack thereof, of groove B352 and/or track B354. Mandrel work station 130-5 is sized to facilitate placement of housing 138 with halfway point 138-1 roughly directly above track B354 to help balance mandrel work station 130-5 relative to the one groove B352. Likewise, mandrel work station 130-7 is sized to facilitate placement of housing 138 with housing 138-1 roughly directly above groove B352 to help balance mandrel work station 130-5 above the one groove B352. Trimming prior to demold saves the non-value added time of placing the composite part 120, 120-1 such as half barrel section 113 and/or wing panel 113-1 into a cell dedicated to only trimming and indexing to the cell and indexing to a edge 129-1 final trim 148, 148-2 trim line 122-8 prior to trimming to a final trim 148, 148-2 and then indexing the composite structure 120, 120-1 to each successive cell in a repetitive part perimeter and contour scan-able process. Using the manufacturing excess 122-1, 122-9 to convey indexing features 126, B126 saves much if not all of the repetitive part perimeter and contour scan-able process time needed to index to each cell when moving through the assembly process.

Groove 352-1, B352 is used to guide and enable longitudinal 101-1 transport of the cutter 133-2 relative to final trim edge 127 with support 355-1 slide-ably engaging it with roller system 350-1. Groove B352 is used to guide and enable transport of the cutter 133-6, 133-7, 133-8 relative to edge 129-1 with support 355-1 slide-ably engaging it with roller system 350-1. Groove 352, B352 is illustrated having a rectangular cross section, but other cross sections are possible. The mandrel work station 130-3, 130-7 is mounted into groove 352-1, B352 and is guided along groove 352-1, B352 to facilitate creating separated manufacturing excess 127-2 or separated flash edge 124-8 from composite part 120, 120-1. The cutter 133-3, 133-6, 133-7, 133-8 has one or more roller systems 350 slide-ably engaging and propelling the cutter 133-3 along mandrel 110, 110-1. The groove 352-1, B352 also provides cutter 133-3, 133-6, 133-7, 133-8 guidance during the creation of bearing edge 123 or edge 129-1, respectively. This means that the roller systems 350 enable movement relative to mandrel 110, 110-1 along groove 352-1, B352 relative to manufacturing edge 127-1, trim line 122-8 leaving final trim edge 127 or edge 129-1 from one end of mandrel 110, 110-1 to the other end. An embodiment has groove 352-1, B352 engaging with roller systems 350 in a rack and pinion arrangement that can also be used to convey position data relative to mandrel 110, 110-1 and/or propel the mandrel work station 130-3, 130-5, 130-7 relative to mandrel 110, 110-1. Thus, in one embodiment the mandrel work station 130-3, 130-5, 130-7 follows one or more grooves 352-1, B352 at the mandrel 110, 110-1. In another embodiment, as shown, one end 141 of the feature creator 132-3 is coupled via roller system 353 and track 354 to composite part 120, 120-1 as part of a flex track type of device and the other end 141-1 of the feature creator 132-3 is coupled via support 355 and roller system 350-1 to groove 352-1. In yet another embodiment, as shown, one end 141 of the feature creator 132-3 is coupled via roller system 353 and track 354 to composite part 120, 120-1 as part of a flex track type of device and the other end 141-1 of the feature creator 132-3 is coupled via support 355 and roller systems 350-1 to groove 352-1, B352. Another embodiment not illustrated has one end 141 of the feature creator 132-3 is coupled via roller system 353 and track 354 to composite part 120, 120-1 as part of a flex track type of device and the other end 141-1 of the feature creator 132-3 is coupled via roller system 353 and track 354 to mandrel 110, 110-1 as part of a flex track type of device without using a connection to groove 352-1, B352. In still another embodiment, as shown, one end 141 of the feature creator 132-3 is coupled via roller system 353 and track 354 to composite part 120, 120-1 as part of a flex track type of device and the other end 141-1 of the feature creator 132-3 is coupled via roller system 353 and track 354 to mandrel 110, 110-1 as part of a flex track type of device and other end 141-1 of the feature creator 132-3 is coupled via support 355 and roller system 350-1 to groove 352-1, B352.

A flex track type of device, such as but not limited to mandrel work station 130-1, 130-4, with a cutter moveably attached to two tracks removably attached to the composite part 120, 120-1 such as half barrel section 113. The tracks 354 are shown removably attached to composite part 120, 120-1 such as half barrel section 113 and/or wing panel 113-1 and mandrel 110, 110-1. The tracks 354, B354, B354-1 are vacuum coupled or by some other means of removable attaching to composite part 120, 120-1 and/or mandrel 110, 110-1. The cutter housing 138-1 spans between the track 354, B354-1 and the groove 352-1, B352 and transports cutter housing 138-1 along the track 354, B354-1 and groove 352-1, B352 by a roller system 353 and rollers system 350-1, respectively. A cutter 133-3 in a cutter housing 138-3 has a transverse mount 133-9 travelling in transverse direction 135 to the feature creator 132-3. The cutter 133-3 includes the blade 137 which is a reciprocating blade or a circular blade or a mill type cutter blade to separate manufacturing excess 127-2 and final trim edge 127 or edge 129-1. An embodiment of the roller system 353 has a rack and pinion connection between the feature creator 132-3 and the tracks 354, B354-1.

Looking at FIGS. 1A, 1B and FIG. 3D, mandrel work station 130-4 includes a cutter 133-4 in a cutter housing 138-4 with a blade 137, such as blade, drill, mill, to create separated manufacturing excess 127-2 from manufacturing edge 127-1 leaving final trim edge 127. The cutting operation is typically performed prior to demolding of the composite part 120, 120-1 from the mandrel 110, 110-1, and creating a final trim edge 127 prior to processing through work stations 160, 160-1 in an assembly line 102, 102-1. Trimming prior to demold saves the non-value added time of placing the composite part 120, 120-1 such as half barrel section 113 into a cell dedicated to only trimming and indexing to the cell and indexing to edge 129-1 or final trim 148, 148-2 or trim line 122-8 prior to trimming final trim 148, 148-2 and then indexing the composite part 120, 120-1 to each successive cell in a repetitive part perimeter and contour scan-able process. Using the manufacturing excess 122-1, 122-9 to convey indexing features 126, B126 saves much if not all of the repetitive part perimeter and contour scan-able process time needed to index to each cell when moving through the assembly process.

While a groove 352-1 is used in some embodiments to guide and enable longitudinal 101-1 transport of the cutter 133-3 relative to final trim edge 127 with support 355-1 slide-ably engaging it with roller system 350-1, it is not illustrated in this embodiment.

In the illustrated embodiment, as shown, one end 141 of the feature creator 132 is coupled to blade 137 while mid-span 141-2 of feature creator 132 is coupled via roller system 353 and track 354 to composite part 120, 120-1 as part of a flex track type of device and the other end 141-1 of the feature creator 132 is coupled via roller system 353 and track 354 to mandrel 110, 110-1 as part of a flex track type of device without using a connection to groove 352-1. The blade 137 is cantilevered over the composite part 120, 120-1 relative to the tracks 354. The controller 150 guides the blade 137 relative to the final trim edge 127 to create separated manufacturing excess 127-2.

A flex track type of device (mandrel work station 130-1) with a cutter moveably attached to two tracks removably attached to the composite part 120, 120-1 such as half barrel section 113. The tracks 354 are shown removably attached to composite part 120 such as half barrel section 113 and mandrel 110, 110-1. The tracks 354 are vacuum coupled or by some other means of removable attaching to composite part 120, 120-1 and/or mandrel 110, 110-1. The cutter housing 138-1 spans between the track 354 and the groove 352-1 and transports along the track 354 and groove 352-1 by a roller system 353 and rollers 350-1, respectively. A cutter 133-4 has a transverse mount 133-9 travelling in transverse direction 135 to the feature creator 132. The cutter 133-4 includes the blade 137 which is a reciprocating blade or a circular blade or a mill type cutter blade to separate manufacturing excess 127-2 and final trim edge 127. An embodiment of the roller system 353 has a rack and pinion connection between the feature creator 132 and the tracks 354. A The flex track type of device is embodied as mandrel work stations 130-1, 130-2, 130-3, 130-4, 130-6, 130-8, The mandrel work stations 130, 130-1, 130-2, 130-3, 130-4 and mandrel 110, 110-1 are capable of being coupled with either grooves 352, 352-1 or tracks 354 or a combination of the two as illustrated in FIG. 1, 3, 3A, 3B, 3C, 3D. As illustrated, mandrel work stations 130, 130-1, 130-2, 130-3, 130-4 and mandrel 110, 110-1 cover several different ways to couple these together. One or more of the several coupling methods could be used for the embodiments of cutter 133, 133-1, 133-2, 133-3, 133-4. Therefore, 133-4 is couplable to mandrel 110, 110-1 by a groove 352, 352-1 similar to cutter 133, 133-3. Similarly, the method of coupling of mandrel work stations 130, 130-1, 130-2, 130-3, 130-4 and mandrel 110, 110-1 are capable of use on cutter 133, 133-1, 133-2, 133-3, 133-4.

A controller 150 manages the operations of the mandrel work station 130, 130-1, 130-2, 130-3, 130-4. In this embodiment, the controller 150 includes an interface, such as an ethernet interface, Universal Serial Bus (USB) interface, wireless interface, etc., for communicating with the mandrel work station 130, 130-1, 130-2, 130-3, 130-4, and includes a memory that stores one or more Numerical Control (NC) programs for operating the mandrel work station 130, 130-1, 130-2, 130-3, 130-4. Controller 150 may further process feedback from mandrel work station 130, and provide instructions based on such feedback. Controller 150 may be implemented, for example, as custom circuitry, as a hardware processor executing programmed instructions, or some combination thereof.

Track 140 guides the mandrel 110, 110-1 in the process direction 101 and may comprise rollers 146, rails, or other components that facilitate movement of the mandrel 110, 110-1. In one embodiment, the track 140 comprises a discretized series of stanchions that are separated in the process direction 101 and to which rollers are mounted. The track 140 includes a drive 142 (e.g., a chain drive or other component) to move the mandrel 110, 110-1 in one embodiment, while in further embodiments an Autonomous Guided Vehicle (AGV) (not shown) is used to move the mandrel 110, 110-1. In one embodiment, the track 140 is also used to move the composite part 120, 120-1, after the composite part 120, 120-1 has been demolded from the mandrel 110, 110-1 while FIG. 1 has the composite part 120, 120-1 carried on into assembly line 102, 102-1 on track 144, 144-1. The feature creator 132 is carried by the track 140, or by another rail or groove system.

After the indexing features 126, B126 have been installed, the composite part 120, 120-1 may be demolded, placed onto track 144, 144-1, and moved in the process direction 101 to a downstream work station 160, 160-1, while the mandrel 110, 110-1 is returned to a cleaning and/or reconditioning station. For example, the mandrel 110, 110-1 may be sent to a pulsed line or dedicated station, such as assembly line 102, 102-1 and work station 160, 160-1, where it is processed for reuse, and potted recesses 322 are recesses within mandrel 110, 110-1 that are filled with potting compound and finished to a mandrel 110, 110-1 surface contour 313 before reused to receive another laminate for hardening into a composite part 120, 120-1. The downstream work station 160, 160-1 utilizes the indexing features 126, B126 in the demolded composite part 120, 120-1 in order to index the downstream work station 160, 160-1 to the composite part 120, 120-1 before performing work such as NDI, drilling, installing fasteners, installing frames, cutting out windows or doors, installing window or door surrounds, etc. In further embodiments, multiple downstream work stations 160, 160-1 are placed along a track 144, 144-1 for carrying the demolded composite part 120, 120-1, and multiple types of indexing features 126, B126 (e.g., having different shapes, sizes, and/or spacing) are installed at the composite part 120, 120-1. In such embodiments, different ones of the downstream work stations 160, 160-1 may utilize different types of indexing features 126, B126 at the composite part 120, 120-1.

In an embodiment, indexing features 126, B126 are created prior to hardening the composite part 120, 120-1. In such an embodiment, the composite part 120, 120-1 is laid-up as a unhardened preform 189, 189-1 onto the layup surface 112 of the mandrel 110, 110-1. In order to apply indexing features before hardening, index contour features 125 on mandrel 110, 110-1 are recesses, indents, dimple, bumps or ridges that are filled with resin and reinforcing fibers or otherwise shapes resin and reinforcing fibers, respectively, thus imparting an indexing feature 126-8, B126-8 into manufacturing excess 122, 128, 122-9 prior to hardening which is made permanent by the hardening process.

Again referring to FIGS. 1A, 1B, a version that does not include indexing features 126, B126 is also envisioned. This version has the bearing edge 123 and/or edge 129-1. Another version has an indexing feature 126, B126 along one manufacturing excess 122-1, 122-9 between final trim 148, 148-2 and bearing edge 123 or edge 129-1, respectively.

Illustrative details of the operation of fabrication environment 100 will be discussed with regard to FIG. 2A. Assume, for this embodiment, that mandrel 110, 110-1 has received a laminate, and that heat and pressure has been applied to harden the laminate on the mandrel 110, 110-1 in order to form the composite part 120, 120-1.

FIG. 2A is a flowchart illustrating a method for applying indexing features 126, 126-1 through 126-7 and B126, B126-1 through B126-7 to composite parts 120, 120-1 in an illustrative embodiment. The steps of method 200 are described with reference to fabrication environment 100 of FIG. 1, but those skilled in the art will appreciate that method 200 may be performed in other systems. The steps of the flowcharts described herein are not all inclusive and may include other steps not shown. The steps described herein may also be performed in an alternative order.

Step 202 includes receiving a mandrel 110, 110-1 to which a composite part 120, 120-1 has been placed. For example, mandrel 110, 110-1 may comprise a contoured layup mandrel onto which the composite part 120, 120-1 has been hardened. The mandrel 110, 110-1 may be continuously moved or pulsed in the process direction during fabrication and/or assembly of the composite part 120, 120-1, or may remain stationary after removal from an autoclave. Receiving the mandrel 110, 110-1 comprises the mandrel 110, 110-1 being placed at a location where it may be indexed by the mandrel work station 130, 130-1, through 130-8.

In step 204, the mandrel work station 130, 130-1, through 130-8 indexes 119-1 to the mandrel 110, 110-1. This may be performed by placing indexing key 136 into one or more of the mandrel indexing features 114, B114 at the mandrel 110, 110-1, in order to precisely enforce a positional relationship/offset between the mandrel 110, 110 and the mandrel work station 130, 130-1, through 130-8. Because the position of the mandrel work station 130, 130-6, 130-8 relative to the mandrel 110, 110-1 is precisely known when coupled with the mandrel indexing feature 114, B114, the mandrel work station 130, 130-6, 130-8 may be operated to install the indexing features 126, B126 as desired. In one embodiment, the mandrel 110, 110-1 includes recesses or holes that facilitate cutting through the composite part 120, 120-1. These recesses may be filled in with potting compound. In such embodiments, the potting compound permits a smooth tooling surface for layup and curing, while also allowing tooling to cut through the inner mold line of the composite part 120, 120-1 and the outer mold line/tooling surface of the mandrel 110, 110-1. In further embodiments, scanners or imaging systems (e.g., cameras, lasers, ultrasonic sensors, etc.) are utilized to index to the mandrel 110, 110-1. Further, index contour features 125 on mandrel 110, 110-1 are recesses, indents, dimple, bumps or ridges that are filled with resin and reinforcing fibers or otherwise shapes resin and reinforcing fibers, respectively, thus imparting a indexing feature 126-8, B126-8 into manufacturing excess 122-1, 122-9, 128 prior to hardening which is made permanent by the hardening process.

In step 206, the mandrel work station 130, 130-6, 130-8 is operated to install part indexing feature 126, B126 into a manufacturing excess 122-1, 128 of the composite part 120, 120-1. The indexing feature 126, B126 is offset from the mandrel indexing feature 114 at the mandrel 110, 110-1. Installing the indexing feature 126, B126 may comprise cutting, drilling, or otherwise removing and/or adding material from or onto the composite part 120, 120-1. In further embodiments installing the indexing feature 126, B126 comprises milling or machining a portion of the composite part 120, 120-1 that was formed during layup. That is, installing the indexing feature 126 comprises machining a layup feature in the composite part 120. For example, this comprises adding cup locating features 126-1, B126-1 for a cup and cone arrangement, drill start locations 126-2, B126-2, drill through locations 126-3, B126-3, slots 126-4, B126-4, installed pins 126-5, B126-5, RFID tags 126-6, B126-6 and bar codes 126-7, B126-7. In embodiments where the indexing feature 126, B126 is a pin that is placed into the composite part 120, 120-1, installing the indexing feature 126 may comprise the pin installer 327 (FIG. 3) driving the pin 126-5, B126-5 through a hole in the composite part 120, 120-1. In one embodiment, the mandrel 110, 110-1 is removed from an autoclave, the separated flash edge 124-1, 124-8 is created from the composite part 120, 120-1 to reveal the bearing edge 123 and edge 129-1. The cutter 133-3, 133-4, 133-5 and 133-6 with a blade 137, such as blade, drill, mill, to create separated manufacturing excess 127-2 and/or separated flash edge 124-8 from manufacturing edge 127-1 leaving final trim edge 127, or edge 129-1 on one or more ends of mandrel 110, 110-1, respectively.

Step 206 may be repeated multiple times (e.g., once per indexing feature 114, B114. Each time the mandrel work station 130, 130-6, 130-8 is progressed relative to mandrel 110, 110-1 from indexing feature 114, B114 to place multiple indexing features 126, B126 to be installed a manufacturing excess 122-1, 128, 122-9 of the composite part 120, 120-1, respectively. The mandrel work station 130, 130-6, 130-8 is progressed in either the process direction 101 when progressing from mandrel indexing feature 114, 114-1 through 114-9 and B114, B114-1 through B114-9 to the next mandrel indexing feature 114, 114-1 through 114-9 and B114, B114-1 through B114-9 and installing each successive indexing feature 126, B126 linked to the mandrel indexing feature 114. The indexing features 126 are used by work stations 160, 160-1 as the composite part 120, 120-1 advances in the process direction 101, respectively.

In step 207, operate the mandrel work stations 130-2 through 130-8 to trim the composite part 120, 120-1 to remove manufacturing excess while composite part 120, 120-1 is still on the mandrel 110, 110-1 using info conveyed by the mandrel 110, 110-1.

In step 208, the composite part 120, 120-1 is demolded from the mandrel 110, 110-1. This may comprise lifting, flexing, or otherwise separating the composite part 120, 120-1 from the mandrel 110, 110-1. The composite part 120, 120-1 then proceeds to an assembly line 102, 102-1 for further fabrication and assembly, while the mandrel 110, 110-1 returns for cleaning, reconditioning and receiving another unhardened preform 189, 189-1 for a composite part 120, 120-1. In one embodiment, the mandrel 110, 110-1 is also reworked (e.g., refilled with potting material, repaired, etc.) and transported to a layup start location. In one embodiment, the composite part 120, 120-1 is placed on track 144, 144-1 for transport to a downstream work station 160, 160-1. The track 144, 144-1 may include rails or stanchions at desired position in order to enforce a desired curvature/contour (e.g., shape and loft) onto the composite part 120, 120-1. The track 144, 144-1 may include rails or stanchions at a position to carry bearing edge 123 in order to enforce a desired curvature/contour (e.g., shape and loft) onto the composite part 120, 120-1, in particular half barrel section 113.

The method then continues, for example, the composite part 120, 120-1 is indexed to work station 160, 160-1 or shuttle, in particular with wing panel 113-1, in an assembly line 102, 102-1 via the indexing features 126, B126, and work may be performed on the composite part 120, 120-1 by one or more of the work stations 160, 160-1 at the same time while the composite part 120, 120-1 is indexed to the one or more work stations 160, 160-1. Again, work may be performed by one or more work stations 160, 160-1 singularly or in multiples at the same time.

In step 210, the composite part 120, 120-1 is advanced in the process direction 101, for example by operating a drive system at the track 144, 144-1, or by pulling the composite part 120, 120-1 along the track 144, 144-1. This may be performed in a micro pulsed, pulsed or continuous fashion, after demolding from mandrel 110, 110-1.

In step 212, the composite part 120, 120-1 is indexed to the downstream work station 160, 160-1 (or any work station, or multiple work stations at the same time, including an upstream or adjacent work station) via the indexing features 126, B126 installed onto the composite part 120, 120-1. For example, the downstream work station 160, 160-1 may couple with (e.g., buck into) the indexing features 126, B126 to determine the positions of the indexing features 126, B126. The downstream work station 160, 160-1 may then adjust its position based on the positions of the indexing features 126, B126, in order to account for any deviations from an expected position/orientation. According to the method of indexing described herein, each downstream work station 160, 160-1 is dependent on the requirements of location accuracy used for the alignment and placement of a component being installed.

Method 200 provides a technical benefit over prior techniques and systems, because it enables indexing features to be applied to a composite part 120, 120-1 while it is still coupled with and taking advantage of precisely fabricated composite part 120, 120-1 and the precisely located and shaped mandrel 110, 110-1. This means that indexing features 126, B126 are added to the composite part 120, 120-1 without the need to reindex the composite part 120, 120-1, because the precise nature of the mandrel 110, 110-1 is known and leveraged onto the composite part 120, 120-1 prior to demolding from the mandrel 110, 110-1. Hence, after demolding, the composite part 120, 120-1 does not need to be probed, scanned, or otherwise inspected as part of an indexing protocol to each work station 160, 160-1 in order to characterize its structure and/or 3D configuration before the indexing features are installed. That is, the install location of each of those indexing features is precisely known by referencing to an indexing feature that has already been installed at the mandrel. The indexing feature also conveys precise 3D configuration characterization about the composite structure within the purview 115, 115-1 of each work station 160, 160-1, respectively. This saves time by not subjecting the composite part 120, 120-1 to the need of scanning to determine the 3D configuration characterization of the structure within the purview of 115, 115-1 or each work station 160, 160-1 as needed in the prior art. The complexity and repetitive time consuming nature of the prior art type of indexing system is magnified by the need to scanably index to each work station 160, 160-1 for the composite part 120, 120-1 within purview 115, 115-1 after each micro pulse 121. Furthermore, since mandrels 110, 110-1 are utilized to fashion multiple composite parts 120, 120-1, respectively, there is little additional labor and time involved in applying mandrel indexing features 114, B114 to the mandrels 110, 110-1 that guide the installation of indexing features 126, B126 for composite parts 120, 120-1. The mandrels 110, 110-1 are fabricated as an initial process prior to composite fabrication. Furthermore, because manufacturing excess 122-1, 128, 122-9 is retained at the composite part 120, 120-1, it communicates its fabrication instructions to each subsequent work station 160, 160-1 as well as 3D configuration characterization of the structure, such as inner mold line contour and/or outer mold line contour, within the purview of 115, 115-1 or each work station 160, 160-1.

FIG. 2B is a flowchart illustrating a method 250 for processing composite parts 120, 120-1 in an illustrative embodiment. Step 252 includes receiving a mandrel 110, 110-1 to which composite part 120, 120-1 has been placed, and may be performed in a similar manner to step 202 above. Step 254 comprises processing the composite part 120, 120-1 through the hardening process and into the assembly line 102, 102-1 after demolding the composite part 120, 120-1 from the mandrel 110, 110-1 based on mandrel indexing features 114, B114 located on the mandrel 110, 110-1. This may comprise installing indexing features 126, B126 into the composite part 120, 120-1, trimming the composite part 120, 120-1, or performing any suitable actions while the composite part remains molded to the mandrel.

FIG. 12 is a side view of a variety of indexing features 126, B126 installed at a composite part 800 in an illustrative embodiment. Any one or combination of these indexing features 126, B126 may be implemented at a given composite part (e.g., a half barrel fuselage section). Indexing features 126, B126 may be placed in a manufacturing excess 802, and these indexing features 126, B126 are installed during the post cure process, prior to demolding. Eventually, when the manufacturing excess 802 is no longer needed for indexing, the manufacturing excess 802 is trimmed off (e.g., before the half barrel fuselage section is fastened to another half barrel section to form a full barrel section wherein the lower half barrel section is joined to the upper half barrel section).

FIGS. 4-11 are views of various indexing features 126, B126.

FIG. 4 is a cross sectional view of composite part 120 and cup 410, which is a type of locating feature 126, but could also apply to composite part 120-1 with indexing feature B126. The cup 410 is a receiver for a cone 420 coupled to work station 160 and/or work station 160-1 during an index mating of composite part 120, 120-1 to work station 160, 160-1, respectively. The cup 410 has a version, as illustrated, forming a passage through composite part 120, 120-1. Another version has the cup 410 not passing entirely through the composite part 120, 120-1. The cup 410 and the cone 420 form a tapered female to male connection, respectively, when indexing occurs.

Figure 5:
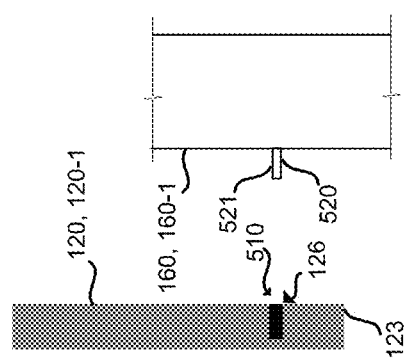

FIG. 5 is a cross sectional view of a drill start 510, one of the indexing features 126, B126. FIG. 5 illustrates a cross sectional view of composite part 120 and drill start 510, which is a type of locating feature 126, but could also apply to composite part 120-1 with indexing feature B126. Drill start 510 is a receiver for a mating coupler 520, such as a stubby pin 521. The drill start 510 is a non-through hole into the composite part 120, 120-1. The drill start 510 and the mating coupler 520 form a female to male connection, respectively, when indexing occurs during an index mating of composite part 120, 120-1 to work station 160, 160-1.

Figure 6:
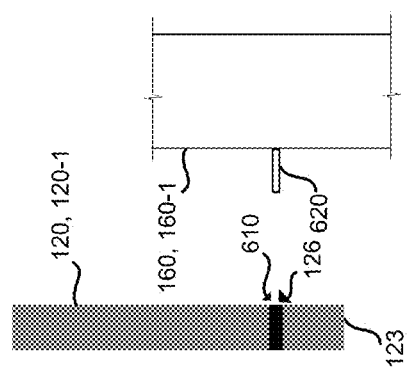

FIG. 6 is a cross sectional view of a drill through 610, one of the indexing features 126, B126. FIG. 6 illustrates a cross sectional view of composite part 120, 120-1 and drill through 610, which is a type of locating feature 126, but could also apply to composite part 120, 120-1 with indexing feature B126. The drill through 610 is a receiver for a pin 620 coupled to work station 160, 160-1 during index mating of composite part 120, 120-1 to work station 160, 160-1. The drill through 610 has a version forming a passage through composite part 120, 120-1. The drill through 610 and the pin 620 form a female to male connection, respectively, when indexing occurs. Pin 620 fills at least a portion of drill through 610 during indexing mating.

FIG. 7 is a cross sectional view of slots 126-4, B126-4, one of the indexing features 126, B126. The slot 710, corresponds to 126-4, B126-4, is a receiver for a slot engager 720 coupled to work station 160, 160-1 during an index mating of composite part 120, 120-1 to work station 160, 160-1. The slot 710 has a version, as illustrated, forming a non-pass through portion of composite part 120, 120-1. Another version, not illustrated, has a slot passing through composite part 120, 120-1. The slot 710 and the slot engager 720 form a female to male connection, respectively, when indexing occurs. Slot engager 720 passes into composite part 120, 120-1 during indexing mating, in one version.

Figure 8:
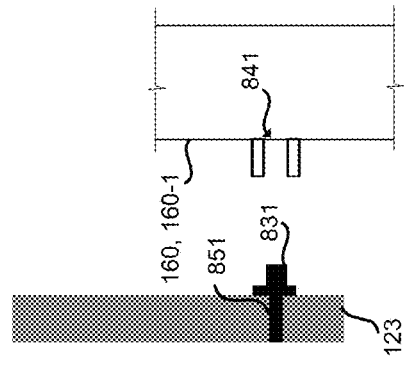
FIG. 8 is a side view of a variety of indexing features installed at a composite part in an illustrative embodiment.

FIG. 8 is a cross sectional view of a drill through 851 with pin 831 install therein and is one of the indexing features 126, B126. FIG. 8 illustrates a cross sectional view of composite part 120, 120-1 and pin 831, but could also apply to composite part 120, 120-1 with indexing feature B126. The pin 831 is a receiver for a pin connector 841 coupled to work station 160, 160-1 during index mating of composite part 120, 120-1 to work station 160, 160-1. The pin 831 and the pin connector 841 form a male to female connection, respectively, when indexing occurs. Pin 620 fills at least a portion of drill through 610 during indexing mating.

FIG. 9 is a cross sectional view of a radio frequency identification (RFID) Chip 910 and is one of the indexing features 126, B126. FIG. 9 illustrates a cross sectional view of composite part 120, 120-1 and RFID Chip 910, but could also apply to composite part 120, 120-1 with indexing feature B126. The radio frequency identification (RFID) Reader 920 is a receiver for RFID Chip 910 communicated information. RFID Reader 920 is coupled to work station 160, 160-1 during index mating of composite part 120, 120-1 to work station 160, 160-1.

FIG. 10 is a cross sectional view of a bar code 1010 and is one of the indexing features 126, B126. FIG. 10 illustrates a cross sectional view of composite part 120, 120-1 and bar code 1010, but could also apply to composite part 120, 120-1 with indexing feature B126. The bar code reader 1020 is a receiver for bar code 1010 communicated information. Bar code reader 1020 is coupled to work station 160, 160-1 during index mating of composite part 120, 120-1 to work station 160, 160-1.

Figure 11:
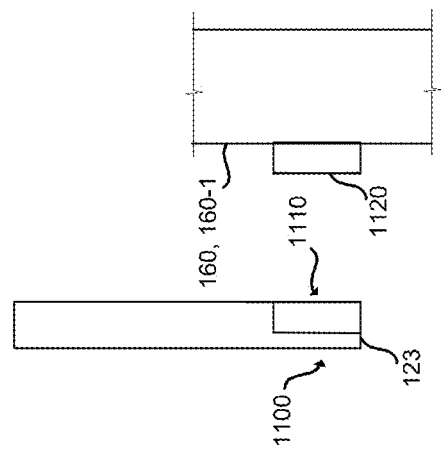
Figure 12:
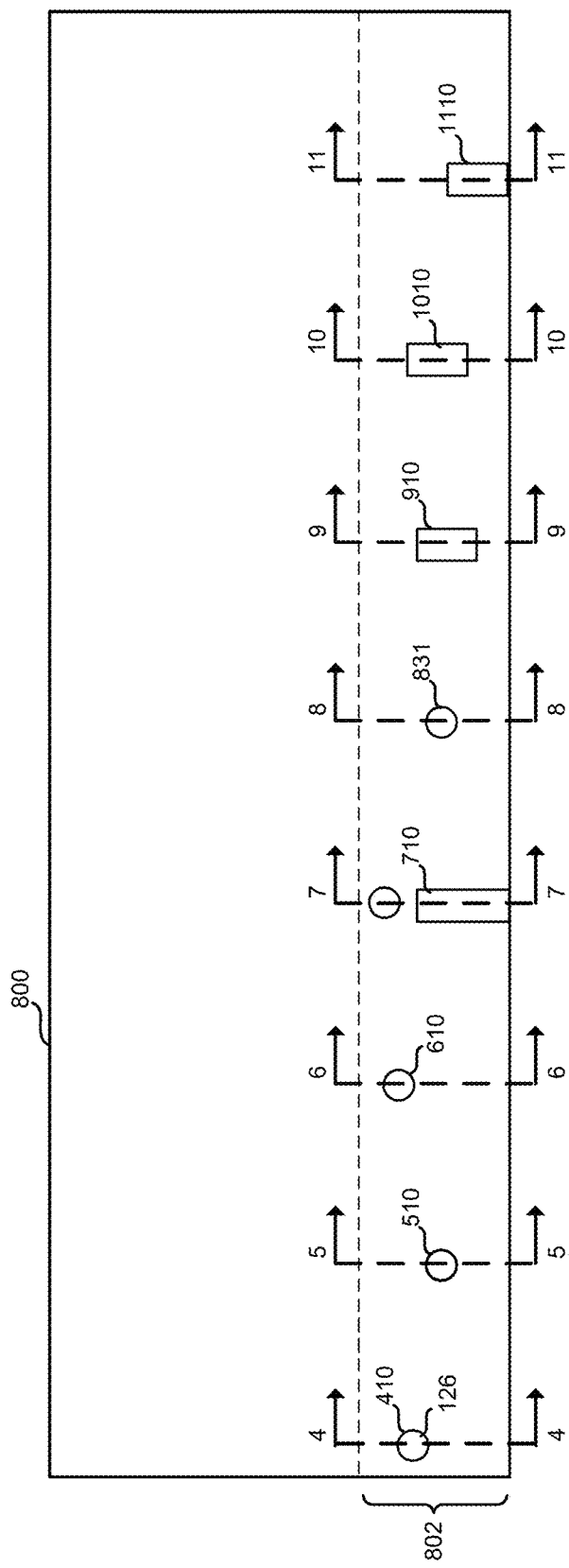

FIG. 11 is a cross sectional view of notch 1110, one of the indexing features 126, B126. Notch 1110 of any suitable shape (e.g., trapezoid, square, triangle, vertical hole, etc.) machined out of the bearing edge 123 of the composite part 800, which terminates leaving a backing 1100 as shown in FIG. 11. The notch 1110 is a receiver for a notch engager 1120 coupled to work station 160, 160-1 during an index mating of composite part 120, 120-1 to work station 160, 160-1. The notch 1110 has a version, as illustrated, forming a non-pass through portion of composite part 120, 120-1. Another version, not illustrated, has a notch 1110 passing through composite part 120, 120-1. The notch 1110 and the notch engager 1120 form a female to male connection, respectively, when indexing occurs. Notch engager 1120 passes into composite part 120, 120-1 during indexing mating, in one version.

Each of these different indexing features 126, B126 may therefore be utilized to facilitate indexing or other operations at various work stations 160, 160-1. For example, some work stations 160, 160-1 may use one type of feature (e.g., blind holes that facilitate placement of a structure relative to the work station 160, 160-1), while other work stations 160, 160-1 may use another type of features (e.g., pins that facilitate gripping of the part). The potential to use male features (e.g., pins) and/or female features (e.g., holes) means that low-profile work stations 160, 160-1 (e.g., NDI inspection stations) can interact with female indexing features 126, B126 of a composite part 120, 120-1 without encountering physical interference, these are all examples of some of the many geometries that could be implemented in order to achieve indexing fits in desired fashions. Still further, the shapes of indexing features 126, B126 (and/or corresponding receptacles at work stations 160, 160-1) may be shaped to constrain the composite part 120, 120-1 to a desired position, without over-constraining the composite part 120, 120-1. For example, a slot 710, is an example of an indexing feature 126, B126 may constrain vertical motion while enabling motion in the process direction 101, while a pin, notch, slot or hole may constrain motion in both the process direction 101 as well as vertically.

In further embodiments, the features described herein may be installed into any suitable portions of the composite part 120, 120-1 (e.g., a door cut-out region or window cut-out region), or indexing features 126, B126 may even be applied to composite parts 120, 120-1 during layup, by placing pins, bladders, or other tools onto a laminate for the composite part 120, 120-1 before the laminate is hardened.

Figure 14:
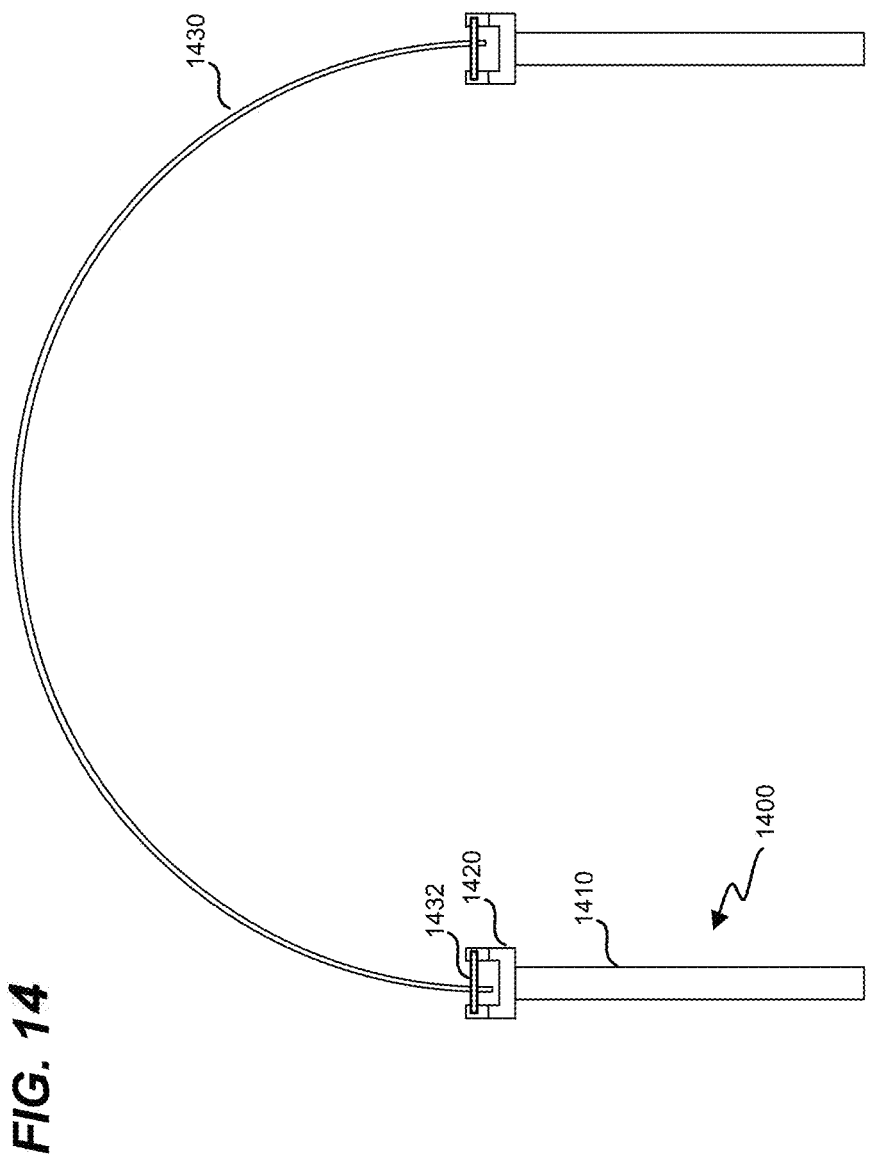
FIG. 14 is a view of a downstream work station that indexes to indexing features installed onto a composite part in an illustrative embodiment.

FIG. 14 is a view of a downstream work station 1400 that indexes 119-1 to indexing features 1432 installed onto a composite part 1430 in an illustrative embodiment. Indexing features 1432 and composite part 1430 correspond to indexing features 126, B126 and composite part 120, 120-1, respectively. In this embodiment, receptacles 1420 at a frame 1410 of the work station 1400 receive indexing features 1432 in the form of pins cantilevered out from composite part 1430. Each pin is engaged and/or engaged by a receptacle 1420 and indexes 119-1 and/or places the composite part 1430 in a desired position along the process direction 101.

Figure 13:
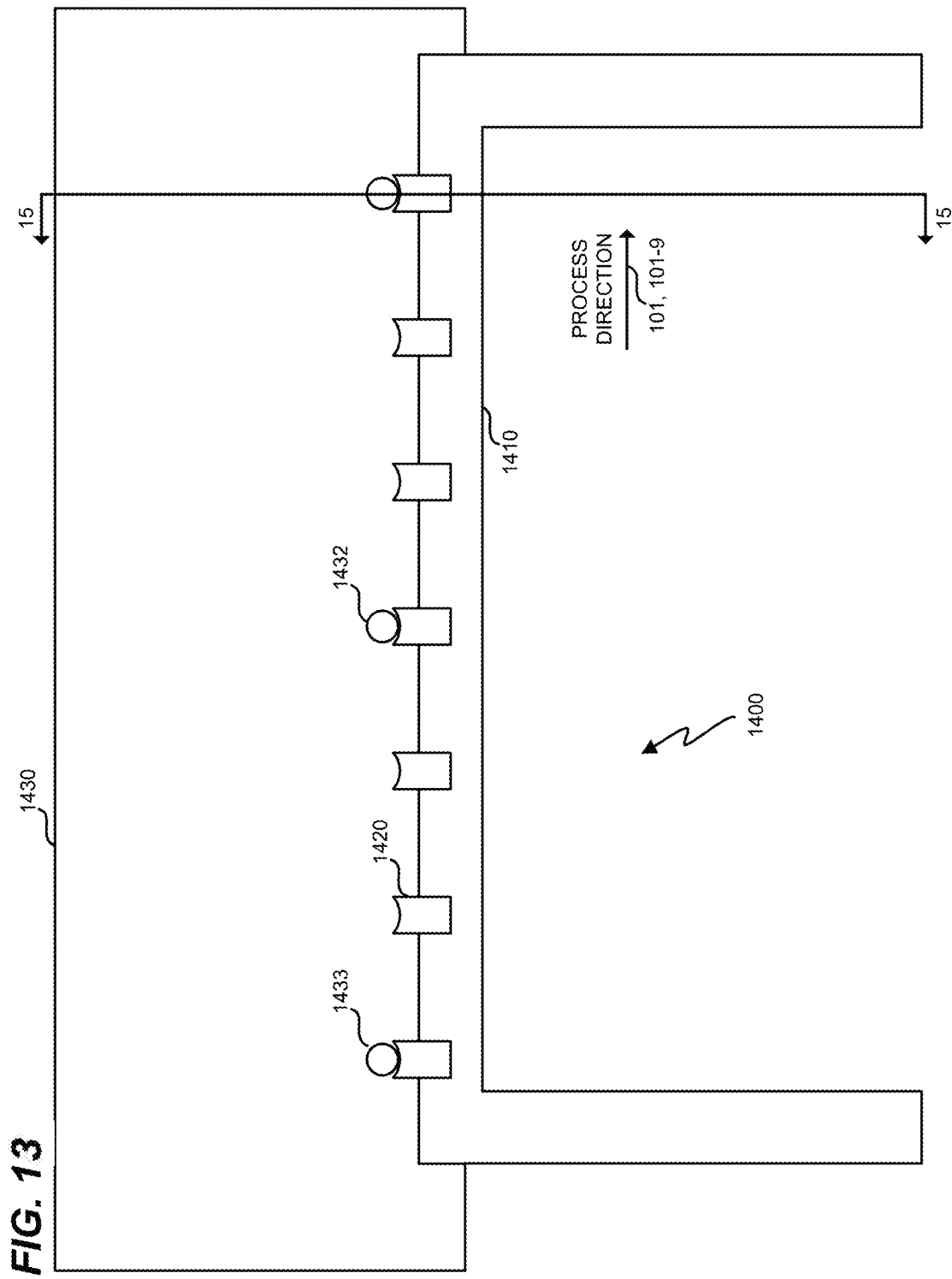

In FIG. 14, which corresponds with view arrows 15 of FIG. 13, the half-barrel shape of the composite part 1430 is clearly visible. Furthermore, the indexing features 1432 (i.e., pins) are more clearly visible within receptacles 1420.

Examples

Referring more particularly to the drawings, embodiments of the disclosure may be described in the context of aircraft manufacturing and service in method 1600 as shown in FIG. 15 and an aircraft 1602 as shown in FIG. 16. During pre-production, method 1600 may include specification and design 1604 of the aircraft 1602 and material procurement

1606. During production, component and subassembly manufacturing 1608 and system integration 1610 of the aircraft 1602 takes place. Thereafter, the aircraft 1602 may go through certification and delivery 1612 in order to be placed in service 1614. While in service by a customer, the aircraft 1602 is scheduled for routine work in maintenance and service 1616 (which may also include modification, reconfiguration, refurbishment, and so on). Apparatus and methods embodied herein may be employed during any one or more suitable stages of the production and service described in method 1600 (e.g., specification and design 1604, material procurement 1606, component and subassembly manufacturing 1608, system integration 1610, certification and delivery 1612, in service 1614, maintenance and service 1616) and/or any suitable component of aircraft 1602 (e.g., airframe 1618, systems 1620, interior 1622, propulsion system 1624, electrical system 1626, hydraulic system 1628, environmental system 1630).

Each of the processes of method 1600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 1602 produced by method 1600 may include an airframe 1618 with a plurality of systems 1620 and an interior 1622. Examples of systems 1620 include one or more of a propulsion system 1624, an electrical system 1626, a hydraulic system 1628, and an environmental system 1630. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1600. For example, components or subassemblies corresponding to component and subassembly manufacturing 1608 may be fabricated or manufactured in a manner similar to components or subassemblies produced while the aircraft 1602 is in service. Also, one or more apparatus embodiments, method embodiments, or a combination thereof may be utilized during the component and subassembly manufacturing 1608 and system integration 1610, for example, by substantially expediting assembly of or reducing the cost of an aircraft 1602. Similarly, one or more of apparatus embodiments, method embodiments, or a combination thereof may be utilized while the aircraft 1602 is in service, for example and without limitation during the maintenance and service 1616. Thus, the invention may be used in any stages discussed herein, or any combination thereof, such as specification and design 1604, material procurement 1606, component and subassembly manufacturing 1608, system integration 1610, certification and delivery 1612, in service 1614, maintenance and service 1616) and/or any suitable component of aircraft 1602 (e.g., airframe 1618, systems 1620, interior 1622, propulsion system 1624, electrical system 1626, hydraulic system 1628, and/or environmental system 1630.

In one embodiment, a part comprises a portion of airframe 1618, and is manufactured during component and subassembly manufacturing 1608. The part may then be assembled into an aircraft in system integration 1610, and then be utilized in service 1614 until wear renders the part unusable. Then, in maintenance and service 1616, the part may be discarded and replaced with a newly manufactured part. Inventive components and methods may be utilized throughout component and subassembly manufacturing 1608 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for preparing a composite part for assembly, the method comprising:
   placing a preform with a manufacturing excess upon a mandrel;
   hardening the preform into the composite part with a hardened manufacturing excess while still upon the mandrel; and
   installing an indexing feature into the manufacturing excess prior to demolding from the mandrel,
   wherein a mandrel work station follows a groove at the mandrel.

2. The method of claim 1 wherein:
   operating the mandrel work station to install the indexing feature comprises subtractive fabrication using drilling, milling or trimming or by additive fabrication such as adding pins adding RFID tags or adding bar codes.

3. The method of claim 1 wherein:
   the mandrel work station cuts through the composite part into a potted recess of the mandrel to install the indexing feature into composite part.

4. The method of claim 1 wherein:
   installing the indexing feature comprises installing a notch at the mandrel.

5. The method of claim 1 wherein:
   installing the indexing feature comprises installing the indexing feature in a manufacturing excess selected from the group consisting of window manufacturing excess and/or door manufacturing excess, and antenna cut-out regions on the composite part.

6. The method of claim 1 wherein:
operating the mandrel work station to install the indexing feature comprises installing multiple types of indexing features, wherein different types of indexing features are utilized by different downstream work stations.

7. The method of claim 1 wherein:
the indexing features installed into the manufacturing excess of the composite part are selected from the group consisting of cup locating features, drill start locations, drill through locations, slots, installed pins RFID tags bar codes, formed indexing feature and notch.

8. The method of claim 1 wherein:
the indexing features installed into the manufacturing excess of the composite part using mandrel indexing features selected from the group consisting of indents, protrusions, ridges, grooves, notches, through-holes, blind holes, RFID tags and bar code.

9. A method for preparing a composite part for assembly, the method comprising:
placing a preform with a manufacturing excess upon a mandrel;
hardening the preform into the composite part with a hardened manufacturing excess while still upon the mandrel; and
installing an indexing feature into the manufacturing excess prior to demolding from the mandrel,
wherein a mandrel work station follows a track at the mandrel.

10. The method of claim 9 wherein:
operating the mandrel work station to install the indexing feature comprises subtractive fabrication using drilling, milling or trimming or by additive fabrication such as adding pins adding RFID tags or adding bar codes.

11. The method of claim 9 wherein:
the mandrel work station cuts through the composite part into a potted recess of the mandrel to install the indexing feature into composite part.

12. The method of claim 9 wherein:
installing the indexing feature comprises installing a notch at the mandrel.

13. The method of claim 9 wherein:
installing the indexing feature comprises installing the indexing feature in a manufacturing excess selected from the group consisting of window manufacturing excess and/or door manufacturing excess, and antenna cut-out regions on the composite part.

14. The method of claim 9 wherein:
operating the mandrel work station to install the indexing feature comprises installing multiple types of indexing features, wherein different types of indexing features are utilized by different downstream work stations.

15. The method of claim 9 wherein:
the indexing features installed into the manufacturing excess of the composite part are selected from the group consisting of cup locating features, drill start locations, drill through locations, slots, installed pins RFID tags bar codes, formed indexing feature and notch.

16. The method of claim 9 wherein:
the indexing features installed into the manufacturing excess of the composite part using mandrel indexing features selected from the group consisting of indents, protrusions, ridges, grooves, notches, through-holes, blind holes, RFID tags and bar code.

17. A method for preparing a composite part for assembly, the method comprising:
placing a preform with a manufacturing excess upon a mandrel;
hardening the preform into the composite part with a hardened manufacturing excess while still upon the mandrel; and
installing an indexing feature into the manufacturing excess prior to demolding from the mandrel,
wherein installing the indexing feature comprises installing the indexing feature in a manufacturing excess selected from the group consisting of window manufacturing excess and/or door manufacturing excess, and antenna cut-out regions on the composite part.

18. The method of claim 17 further comprising:
operating a mandrel work station to install the indexing feature comprising installing multiple types of indexing features, wherein different types of indexing features are utilized by different downstream work stations.

19. The method of claim 17 wherein:
the indexing features installed into the manufacturing excess of the composite part are selected from the group consisting of cup locating features, drill start locations, drill through locations, slots, installed pins RFID tags bar codes, formed indexing feature and notch.

20. The method of claim 17 wherein:
the indexing features installed into the manufacturing excess of the composite part using mandrel indexing features selected from the group consisting of indents, protrusions, ridges, grooves, notches, through-holes, blind holes, RFID tags and bar code.

21. A method for processing a composite part, the method comprising:
receiving a mandrel to which a composite part has been molded;
processing the composite part based on indexing features located on the mandrel; and
a mandrel work station follows a groove and/or track at the mandrel.

22. The method of claim 21 wherein:
operating the mandrel work station to install the indexing feature comprises cutting into the composite part without cutting through the composite part.

23. The method of claim 21 wherein:
the mandrel work station cuts through the composite part into a potted recess of the mandrel to install the indexing feature.

24. The method of claim 21 wherein:
installing the indexing feature comprises installing a notch at the mandrel.

25. The method of claim 21 wherein:
installing the indexing feature comprises installing a notch in a bearing edge of the composite part.

26. The method of claim 21 wherein:
installing the indexing feature comprises installing the indexing feature in a manufacturing excess, window manufacturing excess and/or door manufacturing excess.

27. The method of claim 21 further comprising:
removing a manufacturing excess from the composite part.

28. The method of claim 21 wherein:
operating the mandrel work station to install the indexing feature comprises installing multiple types of indexing features, wherein different types of indexing features are utilized by different downstream work stations.

29. The method of claim 21 wherein:
the indexing features installed into a manufacturing excess, window manufacturing excess and/or door manufacturing excess of the composite part are selected from the group consisting of cup locating features, drill start locations, drill through locations, slots, installed pins, RFID tags, bar codes, formed indexing feature and notch.

30. A method for processing a composite part, the method comprising:
receiving a mandrel to which a composite part has been molded;
processing the composite part based on indexing features located on the mandrel; and
installing an indexing feature comprising installing a notch in an edge at the mandrel of the composite part.

31. The method of claim 30 wherein:
installing the indexing feature comprises installing a notch in a bearing edge of the composite part.

32. The method of claim 30 wherein:
installing the indexing feature comprises installing the indexing feature in a manufacturing excess, window manufacturing excess and/or door manufacturing excess.

33. The method of claim 30 further comprising:
removing a manufacturing excess from the composite part.

34. The method of claim 30 further comprising:
operating a mandrel work station to install the indexing feature comprising installing multiple types of indexing features, wherein different types of indexing features are utilized by different downstream work stations.

35. The method of claim 30 wherein:
the indexing features installed into a manufacturing excess, window manufacturing excess and/or door manufacturing excess of the composite part are selected from the group consisting of cup locating features, drill start locations, drill through locations, slots, installed pins, RFID tags, bar codes, formed indexing feature and notch.

36. A method for processing a composite part, the method comprising:
receiving a mandrel to which a composite part has been molded;
processing the composite part based on indexing features located on the mandrel; and
installing an indexing feature comprising installing a notch in a bearing edge of the composite part.

37. The method of claim 36 wherein:
installing the indexing feature comprises installing the indexing feature in a manufacturing excess, window manufacturing excess and/or door manufacturing excess.

38. The method of claim 36 further comprising:
removing a manufacturing excess from the composite part.

39. The method of claim 36 further comprising:
operating a mandrel work station to install the indexing feature comprising installing multiple types of indexing features, wherein different types of indexing features are utilized by different downstream work stations.

40. The method of claim 36 wherein:
the indexing features installed into a manufacturing excess, window manufacturing excess and/or door manufacturing excess of the composite part are selected from the group consisting of cup locating features, drill start locations, drill through locations, slots, installed pins, RFID tags, bar codes, formed indexing feature and notch.

* * * * *